US008628810B2

(12) United States Patent
Barbano et al.

(10) Patent No.: US 8,628,810 B2
(45) Date of Patent: *Jan. 14, 2014

(54) SIMPLE MOZZARELLA CHEESE-MAKING METHODS

(75) Inventors: David M. Barbano, Dryden, NY (US); John Dunker, Rogersville, MO (US)

(73) Assignee: Cornell University, Ithaca, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/037,860

(22) Filed: Feb. 26, 2008

(65) Prior Publication Data

US 2008/0233236 A1  Sep. 25, 2008

Related U.S. Application Data

(63) Continuation of application No. PCT/US2006/034081, filed on Aug. 30, 2006.

(60) Provisional application No. 60/712,621, filed on Aug. 30, 2005, provisional application No. 60/775,049, filed on Feb. 20, 2006.

(51) Int. Cl.
*A23C 9/12* (2006.01)

(52) U.S. Cl.
USPC ............................ 426/39; 426/36; 426/582

(58) Field of Classification Search
USPC ................................ 426/34, 36, 39, 580, 582
See application file for complete search history.

(56) References Cited

U.S. PATENT DOCUMENTS

| | | |
|---|---|---|
| RE19,123 E | 3/1934 | Wendt |
| 2,415,239 A | 2/1947 | Flowers |
| 2,432,829 A | 12/1947 | Strezynski |
| 2,466,896 A | 4/1949 | Horneman et al. |
| 3,562,910 A | 2/1971 | Runge |
| 3,660,105 A | 5/1972 | Kesterson et al. |
| 3,791,283 A | 2/1974 | Moreno et al. |
| 3,896,241 A | 7/1975 | Malaspina et al. |
| 3,922,375 A | 11/1975 | Dalan et al. |
| 3,961,077 A | 6/1976 | Kielsmeier |
| 4,200,662 A | 4/1980 | Scibelli |
| 4,415,594 A | 11/1983 | Czulak et al. |
| 4,529,606 A | 7/1985 | Fustier et al. |
| 4,705,690 A | 11/1987 | Brand et al. |
| 4,853,243 A | 8/1989 | Kahn et al. |
| 4,959,229 A | 9/1990 | Reddy et al. |
| 5,017,396 A | 5/1991 | Lehmann et al. |
| 5,030,470 A | 7/1991 | Kielsmeier et al. |
| 5,061,503 A | 10/1991 | Kong-Chan et al. |
| 5,202,146 A | 4/1993 | Singer et al. |
| 5,215,778 A | 6/1993 | Davison et al. |
| 5,225,220 A | 7/1993 | Gamay |
| 5,232,720 A | 8/1993 | Nielsen |
| 5,234,700 A * | 8/1993 | Barz et al. .................. 426/42 |
| 5,277,926 A | 1/1994 | Batz et al. |
| 5,374,443 A | 12/1994 | Jackson et al. |
| 5,378,478 A | 1/1995 | Miller et al. |
| 5,554,398 A | 9/1996 | Chen et al. |
| 5,612,073 A | 3/1997 | Gamay |
| 5,679,396 A | 10/1997 | Finnocchiaro |
| 5,709,900 A | 1/1998 | Miller et al. |
| 5,750,177 A | 5/1998 | Yee et al. |
| 5,876,770 A | 3/1999 | Zaikos et al. |
| 5,902,625 A | 5/1999 | Barz et al. |
| 5,952,030 A | 9/1999 | Nelles et al. |
| 5,985,349 A | 11/1999 | West et al. |
| 6,036,979 A | 3/2000 | Hormann et al. |
| 6,113,953 A | 9/2000 | McMahon et al. |
| 6,258,391 B1 | 7/2001 | Hekken et al. |
| 6,340,490 B1 | 1/2002 | Owens |
| 6,350,481 B1 | 2/2002 | Kawachi et al. |
| 6,403,138 B1 | 6/2002 | Arora |
| 6,426,102 B1 | 7/2002 | Isom et al. |
| 6,458,393 B1 | 10/2002 | Lincourt et al. |
| 6,575,725 B1 | 6/2003 | Keel |
| 6,652,899 B1 | 11/2003 | Keel |
| 6,808,735 B2 | 10/2004 | Barbano |
| 2002/0037353 A1 | 3/2002 | Villagran et al. |
| 2003/0077357 A1 | 4/2003 | Rizvi et al. |
| 2005/0031759 A1 | 2/2005 | Barbano |
| 2008/0063765 A1 | 3/2008 | Barbano et al. |
| 2008/0226767 A1 | 9/2008 | Barbano |

FOREIGN PATENT DOCUMENTS

| | | |
|---|---|---|
| DE | 3034038 A1 | 4/1982 |
| EP | 0019415 A1 | 11/1980 |
| EP | 0741976 A1 | 11/1996 |
| EP | 1025762 A2 | 8/2000 |
| EP | 1366671 A2 | 12/2003 |
| WO | WO-9608155 A1 | 3/1996 |

(Continued)

OTHER PUBLICATIONS

"U.S. Appl. No. 12/037,873, Final Office Action mailed Mar. 31, 2010", 10.

Guo, M. R, et al., "Low-fat mozzarella cheese from pre-acidified milk", *Australian Journal of Dairy Technology*, 53(2), (1998), 108.

Holsinger, V H, et al., "Fortifying Soft Drinks with Cheese Whey Protein", *Food Technology*, (Feb. 1973), 59-65.

Kosikowsik, F. K., et al., "Chapter 23—Cheddar Cheese Yields", In: *Cheese and Fermented Milk Foods*, Distributed by Edwards Brothers, Inc., Ann Arbor, MI, (1966), 384-387.

Kosikowski, F. V., et al., "Chapter 23—Low Fat and Specialty Cheeses", In: *Cheese and Fermented Milk Foods, vol. 1*, F. V. Kosikowski, L. L. C., Westport, CT, (1997), 353-378.

Lawrence, R. C., et al., "Texture Development During Cheese Ripening", *J. Dairy Sci.*, 70, (1987), 1748-1760.

McGee, H., "", *On food and cooking : the science and lore of the kitchen*, Collier Books, MacMillan Publishing Co., (1984), 93.

(Continued)

*Primary Examiner* — Leslie Wong

(74) *Attorney, Agent, or Firm* — Schwegman, Lundberg & Woessner, P.A.

(57) ABSTRACT

The invention provides mozzarella cheese of uniform composition that is readily and inexpensively made by acidifying milk prior to beginning the cheese making process. The cheese has excellent melting properties and can be used on a variety of food products (e.g. pizza). No cooking, stretching and aging of the cheese is needed during production to improve the taste or melting properties of the cheese.

37 Claims, 7 Drawing Sheets

(56) References Cited

FOREIGN PATENT DOCUMENTS

| WO | WO-9748283 A1 | 12/1997 |
|---|---|---|
| WO | WO-2006058083 A2 | 6/2006 |
| WO | WO-2006058083 A3 | 6/2006 |
| WO | WO-2007027926 A1 | 3/2007 |
| WO | WO-2007027926 C2 | 3/2007 |

OTHER PUBLICATIONS

McGugan, W. A., et al., "Influence of Volatile and Nonvolatile Fractions on Intensity of Cheddar Flavor", *J. Dairy Sci.*, 62, (1979), 398-403.
Metzger, L. E, et al., "Effect of milk preacidification on low fat mozzarella cheese. I. Composition and yield", *J Dairy Sci.*, 83(4), (Apr. 2000), 648-58.
Metzger, L. E, et al., "Effect of Milk Preacidification on Low Fat Mozzarella Cheese: II. Chemical and Functional Properties During Storage", *J. Dairy Sci.*, 84, (2001), 1348-1356.
Nelson, B. K, et al., "Impact of milk preacidification with CO2 on cheddar cheese composition and yield", *J Dairy Sci.*, 87(11), (Nov. 2004), 3581-9.
Nelson, B. K., et al., "Reduced-Fat Cheddar Cheese Manufactured Using a Novel Fat Removal Process", *Journal of Dairy Science*, 87, (2004), 841-853.
Olabi, A., et al., "Temperature-Induced Moisture Migration in Reduced-Fat Cheddar Cheese", *Journal of Dairy Science*, 85, (2002), 2114-2121.
Rank, T. C., et al., "Secondary Proteolysis of Cheese During Ripening: A Review", *J. Dairy Sci.*, 68, (1985), 801-805.
Rivella, "Revella Products [on line]", *Retrieved from the Internet:<URL:http://www.rivella.ch/index/produkte/rivella_rivella.htm>.*, (Sep. 7, 2009).
St-Gelais, D., et al., "Production of Cheddar cheese using milk acidified with carbon dioxide", *Milchwissenschaft*, 52(11), Milk Science international (German Association of Dairy Science), (1997), 614-618.
Whetstine, M.E. Carunchia, et al., "Flavor Profiles of Full-Fat and Reduced-Fat Cheese and Cheese Fat Made from Aged Cheddar with the Fat Removed Using a Novel Process", *J. Dairy Sci.* 89, American Dairy Science Association, (2006), 505-517.
Zisu, B., et al., "Textural and functional changes in low-fat Mozzarella cheeses in relation to proteolysis and microstructure as influenced by the use of fat replacers, pre-acidification and EPS starter", *International Dairy Journal*, 15(6-9), (Jun.-Sep. 2005), 957-972.
"U.S. Appl. No. 10/205,581, Corrected Notice of Allowance mailed Jul. 9, 2004", 3 pgs.
"U.S. Appl. No. 10/205,581, Notice of Allowance mailed Jun. 8, 2004", 6 pgs.
"U.S. Appl. No. 10/936,377, Examiner Interview Summary mailed Jan. 19, 2006", 4 pgs.
"U.S. Appl. No. 10/936,377, Examiner Interview Summary mailed Jun. 22, 2005", 3 pgs.
"U.S. Appl. No. 10/936,377, Non Final Office Action mailed May 24, 2005", 8 pgs.
"U.S. Appl. No. 10/936,377, Advisory Action mailed Feb. 1, 2006", 3 pgs.
"U.S. Appl. No. 10/936,377, Final Office Action mailed Sep. 5, 2006", 6 pgs.
"U.S. Appl. No. 10/936,377, Final Office Action mailed Oct. 20, 2005", 7 pgs.
"U.S. Appl. No. 10/936,377, Non Final Office Action mailed Apr. 17, 2006", 7 pgs.
"U.S. Appl. No. 10/936,377, Response filed Jul. 17, 2006 to Non Final Office Action mailed Apr. 17, 2006", 13 pgs.
"U.S. Appl. No. 10/936,377, Response filed Sep. 23, 2005 to Non Final Office Action mailed May 24, 2005", 17 pgs.
"U.S. Appl. No. 12/037,873 , Final Office Action mailed Mar. 31, 2010", 10 pgs.
"U.S. Appl. No. 12/037,873, Response filed Jul. 26, 2010 to Final Office Action mailed Mar. 31, 2010", 13 pgs.
"U.S. Appl. No. 10/936,377, Response filed Jan. 19, 2006 to Final Office Action mailed Oct. 20, 2005", 15 pgs.
"U.S. Appl. No. 11/805,412 Final Office Action mailed Aug. 23, 2010", 16 pgs.
"European Application Serial No. 06814020.1 , Office Action Mailed, Mar. 3, 2010", 1Page.
"European Application Serial No. 06814020.1 , Office Action Response Filed, Sep. 10, 2010", 6 pgs.
"Whey, Milk Serum, Serum Lactis, Oregon State University", Retrieved from the Internet: URL:<http://food.oregonstate.edu/glossary/w/whey.html>., (Jul. 30, 2010).
Graham, Nigel J.D., "The Fibra Filter", Article for Filtration and Separation, Environmental & Water Resource Engineering, Department of Civil and Environmental Engineering, Imperial College London, south Kensington Campus, London SW72AZ, (Nov. 2004).
"Sec. 133.173 Pasteurized process cheese food", CFR—Code of Federal Regulations Title 21, (Revised as of Apr. 1, 2011), 2 pgs.
"U.S. Appl. No. 11/805.412, Examiner Interview Summary Dec. 22, 2010", 3 pgs.
"U.S. Appl. No. 12/037,873, Non Final Office Action mailed Jan. 31, 2012", 8 pgs.
"USDA Specifications for Mozzarella Cheese", United States Department of Agriculture, (Effective Jan. 7, 1980), 7 pgs.
"U.S. Appl. No. 12/037,873, Final Office Action mailed Sep. 7, 2012", 10 pgs.
"U.S. Appl. No. 12/037,873, Response filed Jul. 30, 2012 to Non Final Office Action mailed Jan. 31, 2012", 15 pgs.
"U.S. Appl. No. 11/805,412, Non-Final Office Action mailed Sep. 18, 2009", 11 pgs.
"U.S. Appl. No. 11/805,412, Preliminary Amendment filed Nov. 20, 2007", 6 pgs.
"U.S. Appl. No. 11/805,412, Response filed Jan. 19, 2010 to Non Final Office Action mailed Sep. 18, 2009", 18 pgs.
"U.S. Appl. No. 11/805,412, Response to Restriction Requirements mailed Jun. 11, 2009", 9 pgs.
"U.S. Appl. No. 11/805,412, Restriction Requirement mailed Apr. 13, 2009", 6 pgs.
"U.S. Appl. No. 12/037,873, Non-Final Office Action mailed Oct. 19, 2009", 12 pgs.
"U.S. Appl. No. 12/037,873, Response filed Jan. 18, 2010 to Non Final Office Action mailed Oct. 19, 2009", 13 pgs.
"European Application Serial No. 06814020.1, Extended European Search Report mailed Nov. 2, 2009", 12 pgs.
"New Zealand Application Serial No. 566963, Office Action mailed Dec. 10, 2009", 2 pgs.
"Office Action (11805412)", 6.
Aston, J. W., et al., "Contribution of the Components of the Water-soluble Fraction to the Flavor of Cheddar Cheese", *New Zealand J. of Dairy Sci.*, 21, (1986), 229-248.
Guinee, T. P., et al., "Improving the Quality of Low Fat Cheddar Cheese", *Teagasc—Irish Agriculture & Food Development Authority*, http://www.teagasc.ie/research/reports/dairyproduction/4427/eopr-4427.htm, (Feb. 1999), 1-6.
"U.S. Appl. No. 11/805,412, Non Final Office Action mailed Jun. 13, 2013", 18 pgs.
"U.S. Appl. No. 12/037,873, Response filed Dec. 6, 2012 to Final Office Action mailed Sep. 7, 2012", 6 pgs.
"European Application Serial No. 06814020.1, Communication Pursuant to Article 94(3) EPC mailed Jan. 11, 2013", 8 pgs.

\* cited by examiner

SIMPLE MOZZARELLA CHEESE-MAKING METHODS

This application is a continuation of PCT Application Ser. No. PCT/US2006/034081, filed Aug. 30, 2006, which claims benefit of the filing dates of U.S. Provisional Application Ser. No. 60/712,621, filed Aug. 30, 2005, and U.S. Provisional Application Ser. No. 60/775,049, filed Feb. 20, 2006, the contents of which applications are specifically incorporated herein in their entireties.

FIELD OF THE INVENTION

The invention relates to simpler methods for making mozzarella cheese and products that include mozzarella cheese, for example, pizza. The methods of the invention generate excellent mozzarella cheese without the need to melt and stretch the curds (a "pasta filata" process step), while requiring less rennet and salt than currently available processes. Moreover, mozzarella cheese made by the present methods also has better moisture retention properties and can have an increased moisture content to prevent drying, improve shelf life and reduce manufacturing waste and costs.

BACKGROUND OF THE INVENTION

Most methods for making mozzarella cheese, especially those for making shredded mozzarella used on many food products, require about three days and involve about nine processing steps. In general, these processing steps include: making curds in a vat, separating the curds from the whey, cooking and stretching the curds, forming the stretched curds into a ball or block, packaging the cheese ball/block, cooling the cheese ball/block, allowing the cheese to rest for several days, dicing or shredding the cheese and freezing the diced/shredded cheese for use in food products. Some mozzarella cheese-making processes also include a step where the newly formed cheese ball/block is placed in brine. Thus, mozzarella cheese production involves a number of processing steps.

Special equipment is generally used in large-scale mozzarella cheese-making facilities. Such equipment can include vats, strainers, cookers and stretchers, molders, presses, aging environments, shredders, dicers and packaging devices. Significant saving could be realized if mozzarella cheese could efficiently be made without some of these processing steps and types of equipment.

Simpler, more efficient methods for making mozzarella cheese are therefore needed.

SUMMARY OF THE INVENTION

The present invention provides a new approach for making mozzarella cheese that avoids several of the processing steps traditionally used for mozzarella cheese production. The present methods provide moist, flavorful mozzarella cheese with excellent melting properties immediately without the need for cooking and stretching the curds and without use of added moisture binding agents such as starch. Using the methods of the invention, mozzarella cheese curd particles can be individually quick-frozen after production without the need for cooking, stretching, block formation, aging, dicing and/or shredding. The methods of the invention are simple, requiring only a vat for generating the curd particles, a quick freezing device and a packaging means. In some cases an intermediate processing vat may be used, but this intermediate processing vat is not required. Thus, the present methods save time, energy and equipment.

The methods of the invention involve controlling the pH of the cheese making process to optimize the partitioning of minerals and proteins between curd and whey, and between the matrix and water phase within curd particles.

Thus, the present invention involves a method for making mozzarella cheese that includes reducing the pH of pasteurized milk used for making the cheese to a pH of about 5.6 to about 6.2, before adding cheese-making starter cultures. The milk used can be whole milk, skim milk, reduced-fat milk or milk with a standardized fat to protein ratio. The milk can be warmed to a temperature of about 85° F. to about 100° F. after the pH is adjusted and starter bacterial cultures can then be added to ripen and begin the cheese-making process. In some embodiments, the milk is acidified to a pH of about pH 5.80 to about 6.0 when the milk is at a temperature of about 88° F. to about 95° F.

The invention also provides mozzarella cheese made by the methods provided herein as well as food products that include the mozzarella cheese of the invention.

Milk typically has a pH of about 6.6 to about 6.7 at 88° F. Lowering the pH of milk helps the cheese making process and improves the cheese product in a variety of ways. For example, instead of being tightly bound to protein, some of the calcium migrates into the soluble phase and becomes available to rennet, an enzyme required in a later stage of the cheese making process. Moreover, bacterial cultures used to initiate the cheese making process actually grow better under low oxygen conditions, and use of carbon dioxide to acidify the milk tends to drive some of the oxygen out of solution. Such low oxygen and high carbon dioxide levels optimize growth of cheese-making bacteria and inhibit growth of undesirable microorganisms that might contaminate the cheese ingredients. Acid conditions may facilitate movement of proteins such as casein into the water phase. An increased protein content in the soluble phase helps to hold water so that the cheese can maintain a higher, more uniform moisture content without the use of added moisture binding ingredients. Such an improved water holding capacity helps retain moisture and prevents release of water, for example, during cooking and baking. The cheese therefore has a better flavor, melts better, browns better and generally is cheaper to manufacture. A higher protein content in the water phase also helps the cheese waste and manufacturing costs. A higher protein content in the soluble phase also helps the cheese to retain salt, not only reducing the amount of salt needed but also reducing salt run-off and the need to safely dispose of salt waste. Thus, an improved mozzarella cheese is produced using the methods of the invention.

DETAILED DESCRIPTION OF THE INVENTION

Figure 1:
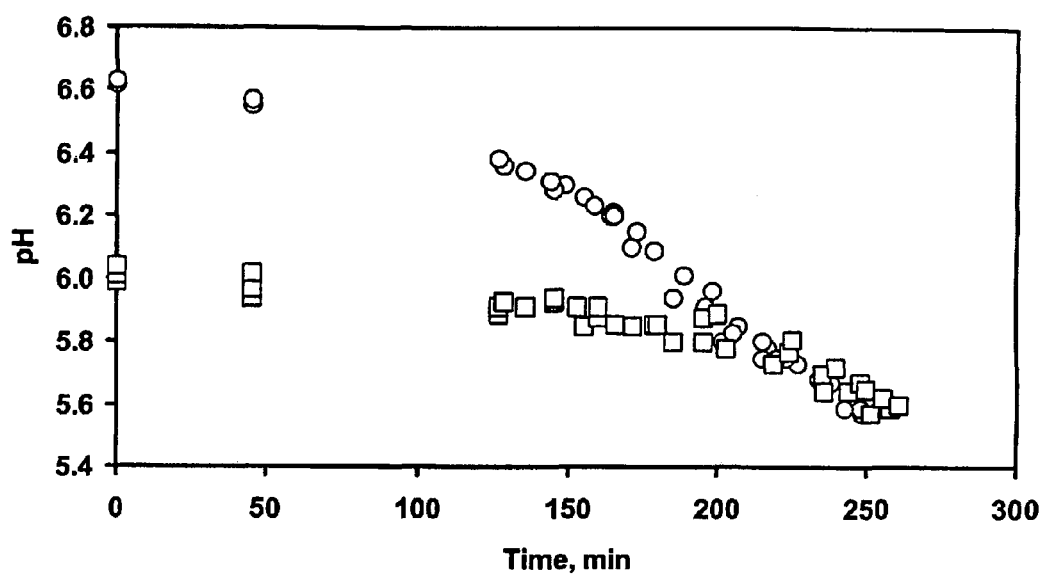
FIG. 1 graphically illustrates milk and cheese pH versus time (minutes) during cheese-making for cheeses made from control milk (○) and milk to which $CO_2$ has been added (□).

The present invention provides a method for making a flavorful, uniformly moist mozzarella cheese with excellent melting properties that includes acidifying the milk used for cheese making before the cheese making procedure is initiated. In general, a cheese making process involves milk pasteurization, warming the milk to a temperature of about 90° F. to about 100° F., incubating the warmed, pasteurized milk with starter bacterial cultures to ripen the milk, adding rennet to coagulate the ripened milk, cutting the coagulate into curd, healing the curd by stirring the curd/whey, raising the temperature of the curd/whey suspension to about 94° F. to about 105° F., separating the curd from the whey, salting the curd, cutting the curds and freezing curd particles or pressing the curd into blocks. One improvement provided by the invention involves acidifying the milk to a pH of about 5.6 to about 6.2, after pasteurizing the milk and before adding cheese making starter cultures. In some embodiments, the pH is adjusted to achieve a pH of about 5.80 to about 5.85 when the milk temperature is about 88° F. to about 95° F. After adding rennet to coagulate the ripened milk, the cheese cultures will continue to produce acid. Once the proper pH (e.g., 5.2-5.3) has been achieved, the whey can be drained and the cheese can be cooled and salted. In general, more salt is retained when the curd is cool. Another improvement involves addition of cold water, cold ultrafiltration (UF) filtrate (permeate) or cold whey to the curd during or after separation of the curd from whey, to reduce curd temperature, for example, to about 83° F. In general, cold whey or cold UF permeate is preferred over water for cooling the curd. This step helps maintain a higher moisture content in the final cheese product.

Mozzarella cheese curd particles made by the present methods can immediately be individually quick-frozen for storage or the particles can be formed into convenient-sized blocks for consumption. In general there is no need to cook and stretch (a pasta filata step) the cheese and there is no need to form blocks, loaves, sheets or ribbons of mozzarella cheese, followed by cooling and shredding. The individually quick frozen curd particles formed by the methods of the invention can be used directly on or in food products without further processing. Not only is there no need for cooking and stretching the mozzarella cheese curd particles of the invention but there is also no need to age or brine the mozzarella cheese made by as described herein. Mozzarella cheese particles made by the present methods are uniformly moist, readily melt without loss of moisture or fat, and have an excellent flavor. Thus, the improvements provided by the invention speed up the cheese-making process, help eliminate waste and improve the uniformity of the cheese product, allow cheese with a higher moisture content to be made and provide a cheese product with excellent melting properties.

Acidification

The milk employed for making mozzarella cheese by the methods of the invention can be whole milk, reduced-fat milk, skim milk or milk standardized to have a desired fat, protein and moisture content. Milk can be standardized to have a specific composition by using milk-based ingredients (e.g. cream, milk fat, or milk proteins), by using milk concentrates and by using milk fractionation products. In some embodiments skim milk is used. Use of skim milk may help to minimize damage to fat globules during acidification. However, such damage to fat globules can be avoided by use of lower temperatures and moderate or slower rates of adding the acidifying agent. Hence, it is not necessary to use skim milk. However, by starting with skim milk, the desired fat content of the cheese can be achieved by addition of precise amounts of cream or milk fat after skim milk acidification. Either non-acidified or acidified cream or milk fat can then be blended into the acidified skim milk to achieve a desired casein to fat ratio, thereby forming a standardized milk that will deliver a cheese with a selected fat on a dry basis. In some embodiments, it is better to add non-acidified cream or milk fat to the acidified skim milk.

The pH of the milk should be adjusted after pasteurization and after some cooling of the milk from the pasteurization process. This is done to avoid fouling of heat exchange surfaces that may occur as a result of the combination of heating and acidifying the milk. Thus, a temperature cooler than that used for pasteurization is generally employed for acidification.

Milk is pasteurized before acidification by heating to at least 72° C. (161° F. to 162° F.) for 15 seconds or longer to destroy potentially harmful bacteria. Milk is then typically cooled to temperatures as low as 30° C. to 31° C. (86° F. to 88° F.) for cheese making. Skim milk can be acidified when the milk has a temperature of less than about 37 to 38° C. (about 100° F.) to as low as 0° C. (32° F.). In some embodiments, the temperature is about 30° C. to 31° C. (86° F. to 88° F.). In other embodiments, the milk can have a temperature of about 10° C. (50° F.) or less when acidification is performed. In some embodiments the temperature is kept below about 7° C. (44° F. to 45° F.) before acidification is performed. In other embodiments, the temperature is kept below about 4° C. (39° F. to 40° F.) before acidification is performed.

The pH of the milk should be reduced from the normal milk pH of about 6.6 to 6.7 (at 88° F.), to a pH of about 5.8 to about 6.2 (at 88° F.), after pasteurization and before adding cheese making starter cultures. In some embodiments, the pH of the milk can be reduced from an initial pH of about 6.6-6.7 to a pH as low as about 5.5, or 5.6, or 5.7, or 5.8, or 5.9, or 6.0, or 6.1, or 6.2 before addition of cheese-making cultures.

The pH can vary somewhat with temperature. Because the milk will be incubated with the starter bacterial culture in the range of about 80° F. to about 105° F., or at a temperature of about 85° F. to 100° F., or at a temperature of about 86° F. to about 93° F., the pH should be measured, adjusted and/or calculated at this temperature.

While the milk can be acidified with any acceptable food acidifying agent, carbon dioxide is generally preferred. When carbon dioxide is used to reduce the pH of milk, the amount of carbon dioxide employed can vary with the amount of milk to be acidified, the composition of the milk and the selected pH level. In some embodiments, approximately 500 ppm to about 2500 ppm carbon dioxide are used. In other embodiments, approximately 1000 ppm to about 2000 ppm carbon dioxide are used, or approximately 1400 ppm to about 1800 ppm carbon dioxide are used to achieve the desired pH.

Thus, after acidification and before adding cheese-making cultures, the milk can be standardized to a desired casein to fat ratio to achieve the desired fat content of the cheese. This is done as described above, by adding milk components or fractionated milk products, such as milk fats and/or milk proteins to the acidified milk.

As described in more detail below, the final moisture content of the cheese is adjusted by controlling a combination of factors, including time of cheese-making, the temperature and curd pH at the initiation of the cooling step and when salting the curd. The amount and type of lactic acid-producing starter culture added in combination with the pH and temperature generally controls the total time of cheese making. In general, the shorter the cheese-making time, the higher the cheese moisture. The temperature of the curd can be cooled by adding cold liquid, for example, cold whey or ultrafiltration permeate or water. The salt content of the final product is controlled by the weight ratio of salt to curd and can be varied to any desired salt content. The final pH of the cheese can be in the range of about 5.0 to about 5.6 and is generally controlled by the initial acidification and by controlling acidification caused by the starter culture during cheese-making. If a higher pH cheese is desired, less starter culture or no starter culture can be used.

Starter Cultures

After acidification, starter bacterial cultures can be used to ripen and begin the cheese making process. In some embodiments, little or no starter cultures may not be used to form a desirable cheese product. Instead, the cheese is formed simply by acidification followed by coagulation.

Starter cultures contain lactic acid producing bacteria that help sour the milk and convert lactose into lactic acid. This helps in the coagulation process. In addition, the starter cultures also have a beneficial effect on the eventual quality, taste and consistency of the cheese.

Any available cheese making starter cultures can be used with the methods of the invention. Starter cultures typically include live cultures of lactic acid bacteria such as, for example, *Streptococcus thermophilus* and *Lactococcus cremoris* bacteria. For example, commercially available cheese making starter cultures such as 911 DVS pellets (Chr. Hansen Inc., Milwaukee, Wis.) can be employed.

These bacterial cultures present in cheese-making starter cultures naturally produce lactic acid and naturally lower the pH of the ripening milk used during cheese-making. The methods of the invention accelerate the pH lowering process and facilitate bacterial action. Use of carbon dioxide as the acidifying agent minimizes oxygen content in the milk culture mixture, further enhancing bacterial action of cheese-making cultures while discouraging growth of microorganisms that are not or should not be involved in the cheese-making process.

Prior to addition of the cheese-making starter cultures, the milk has been standardized as described above to a slightly acidic pH (e.g. pH of 5.80 to 6.20) and is at a temperature of about 80° F. to about 105° F. or about 87° F. to about 89° F. (or about 88° F.). Ripening by starter cultures can be done during the time a vat is filling with milk or for about 30 minutes to about 90 minutes at a temperature of about 85° F. to about 100° F. During this process the pH will typically remain at about 5.6 to about 6.2, or about 5.8 to 6.1, as was established by addition of the acidifying agent (e.g. carbon dioxide). During ripening, the starter culture is mainly producing more cell numbers and is not generating significant quantities of lactic acid.

Coagulation

The ripened milk is coagulated by the addition of rennet. According to the invention, less rennet is needed for making cheese using the acidification procedures described herein. For example, approximately 30% to about 70% less rennet can be used when practicing the methods of the invention. In some embodiments, about 50% of the rennet normally used for cheese-making (without acidification) is used in the cheese-making methods of the invention that involve acidification.

The active ingredient of rennet is the enzyme, chymosin (also known as rennin). Any available rennet can be used in the invention. One source of rennet is the stomach of slaughtered newly-born calves. Vegetarian cheeses are manufactured using rennet from either fungal or bacterial sources. Advances in genetic engineering processes have made recombinantly produced chymosin available. Any of these rennet types can be employed in the invention. For example, rennet can be obtained commercially as Chymax Extra from Chr. Hansen Inc. (Milwaukee, Wis.).

As described above, the amount of rennet employed can be reduced when employing the methods of the invention. In general, when the pre-acidification methods of the invention are used, the amount of rennet employed can be about one-third to about two-thirds of the rennet used for making cheese without pre-acidification. In some embodiments, the amount of rennet employed after pre-acidification is about one-half that used when no acidification is performed. Hence, the methods of the invention can be less expensive than currently available methods because lower amounts of rennin can be used.

The exact amount of rennet employed depends upon the activity of the enzyme. When using Chymax Extra, about 0.05 to about 0.2 milliliters per kilogram of milk can be used; in other embodiments about 0.1 mL/kg of milk is used. The temperature employed during coagulation with rennet can vary. In some embodiments, the ripened milk is incubated at a temperature somewhere between room temperature and body temperature, for example, at about 20° C. to about 37° C., or at about 29° C. to about 33° C.

The coagulation time can also vary. In general, the milk is allowed to coagulate for about 10 minutes to about 40 minutes, or about 15 minutes to about 30 minutes, or about 20 minutes to about 25 minutes.

Curd Production

After treatment with rennet, the coagulum is cut to form curds of desired size. The curds and whey are not stirred for a short while, for example, about 2 min to about 10 min to allow the curds to heal. In some embodiments, the curds and whey are not stirred for about 5 min to heal the curds. After healing, the curds and whey are stirred gently without added heat for 10 min.

Note that the curd will float when carbon dioxide is used as the acidifying agent. The floating of the curd starts to become significant at a temperature of about 94-95° F., which is the temperature at which curd and whey separation should generally be initiated. Hence, cheese vats used for manufacturing mozzarella cheese pursuant to the present methods may be adapted to facilitate floating curd, rather than curd that sinks. For example, the cheese vat may be adapted to permit whey removal from a drain located near the bottom of the vat. Alternatively, the curd (and possibly whey) may be transferred to an intermediate tank that facilitates draining, acid development, cooling (e.g. with cold whey, UF permeate or water) and salting.

After a brief resting period, the temperature is increased a few degrees over a 15 minute time period, to a temperature of about 85° F. to about 105° F., or about 87° F. to about 95° F., or about 88° F. to about 92° F. When using an intermediate tank, the curds and whey can be further heated in the cheese-making vat to about 92 to about 95° F. and then transfer of the curds with the whey to an intermediate tank can begin.

At the end of, or during, this heating process, some whey can be removed. Some of this whey can be warmed and added back to the curds in the intermediate tank. Another portion of this whey can be cooled to about 40° F. and saved for later use. The remaining curds and whey in the vat or intermediate tank are continuously stirred at a temperature of about 95° F. to about 105° F., or at about 100° F. until the curd pH reaches a pH value of about 5.3 to about 5.9.

When the curd pH is about 5.3 to about 6.2, the curd and whey is cooled to a temperature of about 83° F. or lower by addition of the cold whey (or UF permeate or water) that was previously removed at the end of, or during, the heating process. The addition of this cold liquid helps to cool the curd/whey suspension. The combination of the pH of the curd at initiation of cooling and the temperature to which the mixture is cooled can determine (i.e., control) the final moisture content of the cheese. In general, the higher the curd pH at initiation of cooling and the lower the temperature of cooling, the higher the final cheese moisture content. Modulation of temperature and pH allows production of final cheese moistures in the range of about 48% to about 60% moisture. Cooling to a temperature of about 83° F. in combination with a curd pH of about 5.7 prior to salt addition yields a final cheese moisture of about 54% to about 55%. For very high moisture cheeses, the temperature can be reduced to 40° F. prior to salt addition. Addition of cooled whey is preferred over addition of water because whey produces a more flavorful cheese. Also, this is a good use for the whey and reduces waste. In this manner, the moisture content of the cheese can be modulated and increased as desired.

This combination of curd pH and temperature of the whey is an important step in moisture control and pH control. When the curd pH of the cooled whey/curd suspension is appropriate (less than about pH 5.5, or less than about pH 5.3) to achieve the desired final pH of the cheese, the whey is drained off.

The curds can then be salted. For example, three applications of salt can be made with mixing between applications to improve salt retention. The curd is drained and salted at a pH and temperature low enough to achieve the desired final moisture and pH. The combination of low temperature and salt slows down the culture so that the pH does not go too low. Proper combinations of lower pH values and lower temperatures can be used to achieve a higher cheese moisture without having the final pH of the cheese go too low. The desired final pH of the cheese is typically less than about 5.3 and the moisture content is preferably greater than 53%. Depending on the combination of pH and temperature used prior to salting, final cheese moistures of over 60% can be achieved.

Note that less salt can be employed in the cheeses of the invention because the salt is retained better by the curds produced according to the methods of the invention. After salting, the curds can be treated as follows: 1) pressed into blocks, cooled, and shredded as soon as the cheese is cool and then the cheese can be frozen, 2) the curd can be mechanically reduced to a more uniform size distribution and immediately quick frozen, or 3) the curd can be packaged for sale as particulate cheese or pressed into a block and sold as block cheese. While forming a block of cheese, shredding and freezing after a few days achieves a uniformly higher moisture cheese (that can be shredded as soon as it is cool) without the use of added water binding agents that will function well during baking, it adds steps and cost to the process. The second approach eliminates the need for block or loaf forming equipment, shredding, and will allow more efficient cooling of the cheese curd.

In many embodiments therefore, the cheese can be packaged for immediate use or frozen for later use. Thus, no aging is required.

If the cheese will be frozen, the salted curd can immediately be cut into small particles and quick-frozen. Most cheese-making procedures require an aging period of several days before the cheese can be shredded. However, when the present methods are used this aging step can be eliminated.

The desired final pH of the cheese after freezing and thawing is in the range of about 5.1 to about 5.4, with a final percent moisture of greater than 53%. To facilitate quick, uniform freezing, the cheese curds can be cut into small pieces. For example, the cheese can be cut into pieces that are about pea-sized or about the size of diced cheese.

If desired, a hydrophobic surface coating can be sprayed onto the mozzarella cheese particles to help separate the particles and modify their melting characteristics (see, e.g., Rudan & Barbano (1998) J. Dairy Sci. 81:2312-2319). In general, a preferred hydrophobic coating is a vegetable oil, for example, canola oil, corn oil, olive oil, safflower oil, soybean oil, and/or combinations thereof. In some embodiments, the hydrophobic coating is canola oil or corn oil.

Shredded or particulate cheeses made by the process of the invention can be used on top of or within a variety of food products either immediately after production or after freezing. Food products on or within which the particulate or shredded mozzarella cheese of the invention can be used include pizzas (e.g. frozen pizzas), pasta, steaks, chicken dishes, Mexican foods (e.g., tacos, enchiladas, fajitas, etc.), vegetables and the like. Because the cheeses of the invention hold their moisture so well, there is no need to add starch or another agent that improves moisture retention.

Mozzarella cheese, varieties thereof and cheeses used for food products (e.g. pizza cheese) that are produced by the method of the invention can have any amount of fat. For example, the cheese can have a fat on dry basis (FDB) of about 0% (fat-free) to more than 45% (e.g. up to about 65%), with a moisture content of 50% to 60%, salt content of 0% to 2.5%, and pH of about 5.0 to 5.8. In some embodiments, the mozzarella cheese and varieties thereof produced according to the invention can have a fat on dry basis (FDB) of about 40% with a moisture content of 53 to 54%, salt content 1.5 to 1.7, pH of about 5.2-5.3. Such cheeses can be packaged and sold as cheese blocks, diced cheese, shredded cheese or a particulate curds, either as refrigerated or frozen products. In some embodiments, frozen shredded or particulate curds are preferred.

Benefits of Using the Methods of the Invention

Use of carbon dioxide has several beneficial effects upon the cheese-making process and upon the ultimate cheese product. For example, carbon dioxide causes a shift in equilibrium of calcium in the milk moving some of the calcium that is bound to casein into the whey. This shift in calcium enhances the milk coagulation action of rennet and permits less rennet to be used (about 50% less). The removal of bound calcium from casein by carbon dioxide early in the cheese-making process is also important for achieving excellent meltability of the cheese without stretching and molding the curd and without aging the blocks at refrigeration temperatures for several days before shredding (and freezing, if desired).

The removal of bound calcium from casein early in the process due the action of $CO_2$ causes changes the casein matrix structure of the curd particles. When this curd is salted and cooled, more casein moves from the matrix and dissolves in the water phase of the cheese than when $CO_2$ is not used. The casein that has moved into the water phase binds water and allows the cheese to achieve a higher moisture content while still holding the water (without starch or other added water binding agents) during melting or baking. Thus, no starch or other materials need be added to cheeses of the invention to improve the meltability and water retention of the cheese.

Moreover, the casein that has moved into the water phase binds water and this allows a more efficient uptake and retention of salt during the salting process and reduces salt and moisture losses in the process. This reduces salt loss, salt waste and the cost of making cheese.

The cooling of the curd in liquid (e.g., water, whey, or UF permeate) and then stirring until the curd reaches the target pH causes the curd to absorb moisture and increases final cheese moisture. If this is done with water, the cheese will lack flavor and have a watery taste. If it is done with cold whey (or cold UF permeate) the cheese flavor is preserved even though the curd contains a higher moisture. The lower the temperature of the curd the higher the final moisture content of the cheese. This combination of curd pH and temperature of the whey is an important step in moisture control and pH control.

The curd is drained and salted at a pH and temperature low enough to achieve the desired final moisture and pH. The combination of low temperature and the added salt slows down the culture so that the pH does not go too low. Proper combinations of lower pH's and lower temperature's can be used to achieve a higher cheese moisture without having the final pH of the cheese go too low.

Summary of a Preferred Mozzarella Cheese Making Procedure

Standardize the milk (i.e., control fat to casein ratio) to achieve a desired final cheese product with a selected FDB (e.g. about 40%) with desired moisture content (e.g. 53 to 54%), a selected salt content (e.g. 1.5 to 1.7), and a desirable pH (e.g., about 5.3-5.2).

1. Pasteurize the skim milk and inject $CO_2$ into skim milk post pasteurization at 88° F. Blend 88° F. pasteurized cream without $CO_2$ and 88° F. skim with $CO_2$ at the vat as needed to achieve a desired FDB.
2. Heat the milk to 88 to 95° F. The level of $CO_2$ in the milk needs to be sufficient to produce a milk pH as low as 5.80 to 5.85 at 88° F.
3. Add starter culture (e.g. *Streptococcus thermophilis* and *Lactococcus cremoris* blend) and ripen during the vat fill (the shorter the fill time the more culture will be needed).
4. At the end of ripening, add rennet. The amount used can be about 50% of that used when no $CO_2$ is used in the cheese making. Let the milk coagulate (about 20 to 25 minutes) and then cut the coagulum.
5. After cutting, stir gently with no heat (10 min) and then heat the mixture from 88° F. to 92° F. in 15 min.
6. In the vat, heat from 92° F. to about 95° F. and then start the transfer of the curd plus whey to the intermediate tank designed for draining, acid development, and salting. The curd plus remaining whey is heated from 95° F. to 100° F. by addition of hot whey or by any other method (e.g. warming the cheese vat). In a pump over step, about half of the whey should be removed, part can be heated and fed back in to raise the curd temperature to 100° F., and the remainder can be cooled to less than 40° F.
7. Continue stirring the curd and whey at 100° F. until the curd pH reaches 5.6-5.7.
8. At a curd pH of 5.6-5.7 cool the curd from 100° F. to 83° F. by addition of cold whey. The combination of curd pH and temperature are used to control the final pH and moisture of the cheese.
9. At a curd pH of less than 5.3 completely drain the 83° F. whey from the curd. Reduce the temperature of the curd and add salt to the curd in 3 applications with about 5 minutes of mixing between applications. This helps to maintain moisture.
10. Cool the salted curd to 40° F. If particulate cheese is desired immediately cut the salted curd to into small particles about the size of diced cheese. Spray on hydrophobic surface coating to modify melt characteristics if desired.
11. To freeze the cheese, use a procedure that individually quick freezes the particulate cheese and then package it. The cheese can be stored frozen and thawed immediately before use. Alternatively, the cheese can be thawed gradually at refrigeration temperatures over a period of several days. Shredded or particulate cheeses of the invention are particularly useful on pizza (e.g., frozen pizza) and other prepared foods.
12. When the procedures of the invention are used, the pasta filata step, the block or loaf formation step, the brining step, the refrigerated aging step, and the shredding step can effectively be eliminated. Moreover, cheese made by the procedures of the invention can be frozen and thawed before use without loss of moisture or adverse effects upon the texture, taste and melting properties of the cheese. If the cheese will be frozen immediately after it is made, the desired final pH of the cheese after freezing and thawing is less than 5.3 and the final moisture greater than 53%.
13. Thus, the cheese can be stored frozen immediately after it is made and thawed immediately before use.

Cheese Composition, Flavor and Texture

The composition of the cheeses produced by the methods of the invention is improved in several respects. First, the cheese is uniformly moist, in part because it is not brine salted. Second, the moisture content of the present cheeses is somewhat increased, for example, from about 50% up to about 60%. In some embodiments, the cheeses of the invention have a moisture content of about 53% to about 54%. Such an increase in moisture improves the economics of cheese production. Third, the cheese does not bleed moisture. It is believed that the moisture in the cheese is retained by the higher content of protein in the soluble phase of the cheese which occurs because the milk is acidified (e.g. with carbon dioxide) before the cheese-making cultures and enzymes are added.

The flavor of cheeses produced by the methods of the invention is not adversely affected by the pre-acidification procedure and is generally improved by the increased moisture, improved salt retention and improved melting characteristics of the cheese.

The texture of cheeses is typically due to the proteolytic breakdown of the casein matrix and possibly to changes in casein-water-calcium interactions as a function of aging. The methods of the invention improve the texture of cheese in several respects. Addition of an acidifying agent shifts the equilibrium of calcium from being bound to casein to being in solution within the water phase of the cheese and/or to being in the whey. The removal of bound calcium from casein also shifts the insoluble-soluble casein equilibrium towards solubility. Thus the matrix structure of casein particles changes. This change in the casein matrix improves the melting characteristics of cheese without the need for extensive cooking, stretching and aging.

Thus texture of cheese made by the procedures of the invention is moister, smoother and dissipates even more quickly in the mouth than cheese made without use of acidifying agents. As illustrated herein, the melting properties of mozzarella cheese made by the methods of the invention are excellent. The mozzarella cheese melts smoothly and uniformly, exhibiting "stretchiness" characteristic of melted mozzarella cheese.

Use of the Present Mozzarella Cheese in or on Food Products

The invention contemplates a number of food products containing the present mozzarella cheese of the invention. Thus, while in some embodiments the invention is directed to block, shredded, diced or particulate mozzarella cheese sold frozen or at refrigerator or room temperatures, the invention also contemplates fresh or frozen food products containing the mozzarella cheese of the invention. For example, the invention is also directed to Italian, Spanish, Mexican, Dutch, German, French and Russian food products that contain or include the mozzarella cheese of the invention. Thus, the invention provides food products such as pizza, mozzarella sticks, pasta dishes (e.g., lasagna, stuffed shells, manicotti etc.), meat dishes (e.g. chicken parmesan), vegetable dishes (e.g. stuffed eggplant, stuffed peppers or stuffed potatoes), breads, soups (e.g. onion soup), and other food products that typically include mozzarella cheese or can be adapted to include mozzarella cheese.

One food product to which the present mozzarella cheese may be added or applied is pizza. As illustrated herein, the cheese of the invention, made without cooking, stretching and aging, has excellent melting properties and can readily be used on pizza.

In one embodiment, the mozzarella cheese of the invention is shredded, diced or particulate and then frozen for addition or application to a food product. In another embodiment, the non-frozen mozzarella cheese is applied to a food product, which is then frozen or sold without freezing.

The invention will now be illustrated by the following non-limiting Examples.

EXAMPLE 1

Comparison of Procedures for Controlling Moisture Migration in Cheese

In this Example, three approaches to reducing moisture migration in 290 kg blocks were evaluated: (1) addition of hydrocolloids (e.g., starch, cellulose) to milk during cheese making, (2) addition of denatured whey proteins (e.g., Simplesse®) to milk during cheese making, and (3) addition of $CO_2$ to milk to shift casein monomers and calcium from the micelles into the water phase of the milk, prior to rennet addition, to bind water and reduce moisture mobility in the cheese. Some of the materials in the first two approaches increased the moisture content of the cheese, but did not make a major reduction in moisture migration during cooling of the cheese. The addition of $CO_2$ to milk was very effective at reducing moisture migration in cheese during cooling and the results of that work are reported below.

Note that while Mozzarella cheese is not formed into large blocks, the same basic physical and chemical effects of carbon dioxide on making blocks of cheese also operates to improve the water holding capacity of mozzarella cheese when it is made from milk products acidified with carbon dioxide. Thus, while moisture migration within blocks of Mozzarella cheese is not a significant issue, the melting properties and moisture retention in the Mozzarella cheese are important properties that require attention in order to produce an optimal Mozzarella cheese product. Therefore, the following description of the acidification using carbon dioxide provides insight into the processes at work when using carbon dioxide for Mozzarella cheese production.

Materials and Methods

Milk Carbonation

The milk carbonation system was a countercurrent stainless steel tubular heat exchanger (internal diameter=0.5 cm) circulated with 0 to 1° C. water. The carbonation system consisted of four units. They were sequentially from inlet to exit: (1) a milk feed reservoir; (2) a peristaltic feed pump (Amicon LP-1 pump, Beverly, Mass. with a Cole-Palmer Masterflex® 7015-81 pump head, Vernon Hills, Ill.) which fed the milk (4° C.) into the carbonation system at a flow rate of 900 ml/min; (3) a $CO_2$ injection port, which was a stainless steel tube (internal diameter=0.08 cm) inserted through a tee-fitting perpendicular to the milk flow; and (4) a holding section in which the milk was kept at 2 to 3° C. Throughout the system, several temperature probes were inserted inline through tee-fittings to monitor milk temperature. $CO_2$ (beverage grade) was injected inline into cold skim milk as it entered the carbonation system. The $CO_2$ injection port was connected to a $CO_2$ tank [$CO_2$ line pressure=55 psi (380 Kpa)] and the flow rate of $CO_2$ (1110 ml/min) was controlled with a flow meter. The $CO_2$ flow rate was determined in a preliminary experiment to achieve a target concentration of $CO_2$ in milk of approximately 3000 ppm. Carbonation of pasteurized skim milk was done at 2 to 3° C.

Cheese Making Procedure

Reduced-fat Cheddar cheese was made by transferring either 215 kg of 4° C. pasteurized carbonated, or 215 kg of noncarbonated, skim milk to a cheese vat (model 4MX; Kusel Equipment Co., Watertown, Wis.). The casein to fat ratio was standardized by adding non-carbonated pasteurized heavy cream (approximately 40% fat) to achieve a 50% fat reduction (compared to full-fat Cheddar cheese) in the final cheese. A stirred-curd cheesemaking procedure was used, as previously described in Olabi and Barbano, J. Dairy Sci. 85: (2002).

The amount of chymosin and starter added per unit weight of milk was the same for carbonated and noncarbonated milk and the time from chymosin addition to cutting was 30 min. The coagulum was cut with 1.2 cm wire cheese knives and then allowed to heal for 5 min. Healing was followed by slow agitation for 10 min at 31° C. The temperature was increased from 31 to 33° C. and from 33 to 37° C. in two 15 min intervals. The curd plus whey was stirred at 37° C. until a whey pH of 6.2 was achieved. Because the pH of the whey produced from carbonated milk was already lower than 6.2 (mean of three cheese-making trials was 6.01), the whey was drained, as soon as the second phase of cooking (at 37° C.) ended.

At this point most of the whey was drained and the remaining curd-whey mixture was stirred at 37° C. until a curd pH of 5.8 was attained. Next, additional whey was removed and cold water (ca. 5° C.) was added until a curd temperature of 28° C. was achieved. Stirring was continued until a curd pH of 5.6 was achieved. Next, the mixture of whey plus water was drained from the curd, the curd was weighed, and salt was added (total of 2.7% wt/wt) in three equal portions with a 5-min interval between applications. The curd plus salt was mixed for about 1 min after each salt addition. The salted curd was put into an 18 kg stainless steel Wilson hoop and pressed, using a hydraulic A-Frame press (Model AFVS, Kusel Equipment Co., Watertown, Wis.), at 10 psi (70 kPa) for 30 min followed by 60 psi (420 kPa) for 4.5 h at room temperature.
Sampling Immediately after the 18 kg blocks of cheese (one bock for each treatment) were removed from the press they were cut and sampled in a walk-in climate control room at 27±0.5° C. The internal temperature of the blocks of cheese was approximately 25° C. Each 18 kg pressed block was cut in half at the middle and then three 17.78×7.62×2.54 cm (length, width, thickness) slabs of cheese were obtained from the center of each block. These slabs were immediately vacuum packaged (Multi Vac model 160; Koch, Kansas City, Mo.) in 3-mil polyethylene bags (25.4×45.7 cm, standard barrier; Koch, Kansas City, Mo.). In addition, two slabs of 28.6×14.0×2.54 cm (length, width, thickness) were cut from the 18 kg cheese block and vacuum packaged, as described above. The two slabs were cooled immediately and stored at 4° C. One slab was used for the cheese composition analysis and the other slab was used for the expressible serum analysis.

After the 17.78×7.62×2.54 cm cheese slabs were vacuum packaged, each bag was marked with horizontal lines to identify each 2.54 cm position. The different positions were numbered from the bottom (1) to the top (7). The slabs were attached to the suspension wires on a temperature gradient apparatus designed to cause moisture migration upwards from position 1 to position 7. The apparatus consisted of a water bath and a rotating cylinder designed to gradually raise vacuum packaged slabs of cheese out of the 27° C. water into the 3° C. air over a period of 36 h.

The 3° C. slabs of cheese were removed from the apparatus after 36 h and cut with a knife into 2.54 cm pieces by position. The cheese from each position was ground in a blender (model 31BL92; Waring, New Hartford, Conn.) and placed into two 50 ml plastic snap-lid vials (leaving no head space) and held at 4° C. after blending. The pH of cheese from each position within each slab was measured at 23° C. as a single measurement within 2.25 h of grinding and the moisture content of the cheese within each position was measured in triplicate within 24 h after sampling.
Chemical Analyses Titratable acidity of the milk and whey was determined as described in Marshall (1992) Chemical and physical methods. Pages 433-529 [method number 15.3.A] in Standard Methods for the Examination of Dairy Products (16$^{th}$ ed.) American Public Health Association, Washington, D.C. The pH of the milk, whey and cheese was determined using pH model HA405, Mettler Toledo electrode, Columbus, Ohio and Accumet pH meter, model 915; Fisher Scientific, Fair Lawn, N.J.) during cheese manufacturing. The electrode was immersed in 3 M KCL storage solution at 38° C. between pH measurements to improve response speed and stability. Reference solutions (Fisher Scientific, Fair Lawn, N.J.) for pH 4 (SB 101-500) and pH 7 (SB 107-500) were used at 38° C. for calibration of the pH meter. The actual pH of the reference buffers was calculated for 38° C. based on the temperature coefficients recommended by the buffer manufacturer.

After cheese manufacture, the fat content of milk was determined by the Babcock method for milk (Association of Official Analytical Chemists, Methods of Analysis (17$^{th}$ ed. 2000); method number 33.2.27; 989.04) and whey by skim milk Babcock test [(Marshall, 1992); method number 15.8.B] modified for use at 48° C., instead of 58° C. for tempering and reading the fat columns (Lynch et al., JAOACI. 80. 845-859 (1997)). Total nitrogen (TN) for the milk and whey was determined by Kjeldahl ((Association of Official Analytical Chemists, 2000); method number 33.2.11; 991.20). Nonprotein nitrogen in milk and whey was determined by Kjeldahl ((Association of Official Analytical Chemists, 2000); method number 33.2.12; 991.21). Noncasein nitrogen (NCN) was determined by Kjeldahl ((Association of Official Analytical Chemists, 2000); method number 33.2.64; 998.05). The casein content was calculated as TN minus NCN multiplied by 6.38. Calcium was determined by an atomic absorption spectroscopy procedure of Brooks et al. (Atomic absorption Newsletter 9(4): 93-94 (1970)), as modified by Metzger et al. (J. Dairy Sci. 83:648-58 (2000)). The ppm $CO_2$ content of the milk was determined using an infrared gas analysis method described by Ma et al. J. Dairy Sci. 84: 1959-68 (2001). All analyses were performed in duplicate.

To prepare cheese for analysis of moisture, fat, protein, salt, calcium, and pH, the cheese from the 28.6×14.0×2.54 cm slab was ground in a blender (model 31BL92; Waring, New Hartford, Conn.) to a particle size of 2 to 3 mm. The ground cheese particles were packed into 50 ml plastic snap-lid vials (leaving no head space) and immediately placed in a 4° C. refrigerator. Fat content was determined by the Babcock method (Marshall (1992) Chemical and physical methods. Pages 433-529 in Standard Methods for the Examination of Dairy Products (16$^{th}$ ed.). American Public Health Association, Washington, D.C.; method number 15.8.A). To determine fat content 9 g of cheese was used with 12 ml of distilled water at 100° C. Total nitrogen was determined by Kjeldahl using a 1 g sample size. See, Association of Official Analytical Chemists (2000) Official Methods of Analysis. 17$^{th}$ ed. AOAC, Gaithersburg, Md. (method number 33.2.11; 991.20). Salt content was determined by the Volhard test ((Marshall, 1992); method number 15.5.B.); and moisture was determined gravimetrically, by drying 2 g of cheese at 100° C. in a forced air oven (model OV-490A-2; Blue M, Blue Island, Ill.) for 24 h)(Association of Official Analytical Chemists, 2000); method number 33.2.44; 990.20). Calcium was determined by an atomic absorption spectroscopy procedure of Brooks et al. (Atomic Absorption Newsletter 9(4): 93-94 (1970) and as modified by Metzger et al. (J. Dairy Sci. 83: 648-58 (2000). Cheese pH was measured at 23° C. The analyses were done in duplicate for pH, salt, and calcium, in triplicate for fat and total nitrogen, and in quadruplicate for moisture. The amount (g/100 g of cheese) of expressible serum was determined at d 2 of refrigerated storage, as described by Guo and Kindstedt (J. Dairy Sci. 78:2099-2107 (1995)) with one modification. The cheese serum was removed by centrifugation at 25,000×g (maximum force) instead of 12,500 (maximum force).
Experimental Design and Statistical Analysis Two vats of reduced-fat Cheddar cheese, one from non-carbonated and one from a carbonated portion of the same milk, were made side by side in each of 3 wk. One 18 kg block of reduced fat Cheddar cheese was produced for each treatment in each of the three weeks. On each week, three cheese slabs for each treatment were removed from each 18 kg block, as described by Olabi and Barbano, J. Dairy Sci. 85: (2002). The cheese slabs were put on the apparatus using a temperature gradient designed to move moisture upward. In the ANOVA model, treatment was a category variable and position was a continuous variable, while cheese making week (i.e., batch of milk) was blocked as a fixed effect. The position variable was transformed to make the data set orthogonal. Therefore, positions 1, 2, 3, 4, 5, 6 and 7 were coded as −3, −2, −1, 0, +1, +2, and +3, respectively, as the input data for the position variable in the ANOVA. The interaction term between treatment and cheese making week and position was used as the error term for the main effects. The PROC GLM procedure of SAS was used for all data analyses (SAS version 8.02, 1999-2001).

Results

Milk Composition and $CO_2$ Content

No significant difference (P>0.05) in fat, protein, casein, and NPN content of the standardized milk with and without added $CO_2$ was detected (Table 1).

TABLE 1

Mean (n = 3) milk, whey, and cheese composition for control and $CO_2$ treatments.

| Sample type | Treatment | | |
|---|---|---|---|
| | CONTROL | $CO_2$ | LSD |
| Milk | | | |
| Fat, % | 1.23 | 1.23 | NS |
| Protein, % | 3.06 | 3.01 | NS |
| Casein, % | 2.23 | 2.20 | NS |
| NPN[1], % | 0.20 | 0.21 | NS |
| $CO_2$ at 4° C.[2], ppm | $139^B$ | $3175^a$ | 800 |
| $CO_2$ at 31° C.[3], ppm | $110^B$ | $1721^a$ | 523 |
| pH at 31° C. | $6.63^A$ | $6.01^b$ | 0.05 |
| TA[4] at 31° C. | $0.16^B$ | $0.42^a$ | 0.09 |
| Whey | | | |
| Fat, % | 0.05 | 0.06 | NS |
| Protein, % | 0.80 | 0.79 | NS |
| NPN[1], % | 0.27 | 0.26 | NS |
| Cheese | | | |
| Moisture, % | $47.72^b$ | $53.48^a$ | 3.01 |
| Fat, % | $15.17^a$ | $13.61^b$ | 0.64 |
| FDB, % | 29.00 | 29.26 | NS |
| Protein, % | $30.59^a$ | $26.64^b$ | 1.69 |
| PDB, % | $58.51^a$ | $57.27^b$ | 0.78 |
| M/P[5] | $1.56^b$ | $2.01^a$ | 0.22 |
| Salt, % | $2.04^b$ | $2.40^a$ | 0.28 |
| S/M[6], % | 4.27 | 4.50 | NS |
| pH | 5.08 | 5.09 | NS |

$a,b$means within row not having a common superscript differ (p < 0.05).
[1]NPN expressed as nonprotein nitrogen times 6.38.
[2]$CO_2$ at 4° C. = $CO_2$ content of pasteurized carbonated skim milk.
[3]$CO_2$ at 31° C. = $CO_2$ content of vat milk collected just before the addition of starter culture.
[4]TA = titratable acidity.
[5]M/P = moisture to protein ratio.
[6]S/M = salt concentration in moisture.

The titratable acidity of the milk with added $CO_2$ was very high (Table 1) and reflects the degree of interaction of $CO_2$ with water to form carbonic acid in the milk. The system for addition carbon dioxide to skim milk used in this study increased (P<0.05) the level of $CO_2$ in the 4° C. skim milk prior to cheese making and achieved our target of approximately 3000 ppm of $CO_2$ (Table 1). After addition of cream, that did not contain $CO_2$, to the skim milk, the mixture was stirred and heated from 4° C. in an open cheese vat to 31° C. prior to cheese making. During this process some $CO_2$ was lost from the milk. The $CO_2$ content of the standardized milk at the point of starter culture addition at 31° C. had decreased from about 3000 ppm to about 1721 ppm (Table 1).

Addition of $CO_2$ to milk caused a decrease in milk pH from 6.63 to 6.01 at 38° C. (Table 1), as was expected from the results of Ma et al., J. Dairy Sci. 84:1959-1968 (2001). Ma et al. (2001) also reported a corresponding decrease in milk freezing point as the concentration of $CO_2$ in milk increased and pH decreased. The decrease in freezing point reported by Ma et al. (2001) is caused by the combined effects of the dissociation products of carbonic acid and the shift in equilibrium from bound calcium phosphate in the casein micelles to soluble calcium phosphate in the serum phase of milk. De La Fuente et al. (J. Food Prot. 61:66-72 (1998)) reported that addition of HCl, lactic acid, and $CO_2$ to milk to produce a reduction of milk pH to 6.1, all produced an increase in the proportion of soluble calcium in cow's milk and a similar effect was reported for sheep and goat milks. The increase in soluble calcium content, caused by $CO_2$ addition to milk, would be expected to influence milk coagulation properties.

Lowering the pH of milk also has an effect on micelle structure. As the pH of milk is lowered, a considerable portion of the micellar casein solubilizes. Dalgleish and Law, J. Dairy Res. 55:529-538 (1988); Singh et al., J. Dairy Sci. 79:1340-1346 (1996); van Hooydonk et al., Neth. Milk Dairy J. 40:281-296. (1986). In the case of the milk containing $CO_2$ prior to cheesemaking, this means that a higher level of soluble casein should have been present in the serum phase of milk prior to rennet addition. It was not clear if these nonmicellar caseins would be trapped in the rennet coagulation or if they will be lost in the whey.

Cheesemaking

The curd was visibly firmer at 30 min and started to coagulate sooner after rennet addition for the milk with added $CO_2$ than for milk without $CO_2$. Okigbo et al. ((1985) J. Dairy Sci. 68:3135-3142), found that reducing milk pH prior to rennet addition increased the speed of milk coagulation with rennet. Other workers have reported decreased coagulation time. (Calvo et al. (1993) J. Food Prot. 56: 1073-1076; De la Fuente, et al. (1998) J. Food Prot. 61:66-72). Further work indicates that addition of $CO_2$ may reduce the amount of rennet used in cheese making (McCarney, et al. (1995) Milchwissenschaft 50:670-674; Montilla et al. (1995) Z. Lebensm Unters Forsch. 200.289-292; St-Gelais et al. (1997) Milchwissenschaft 52: (11) 614-618).

The decision of when to drain the whey in our cheese making was based on the pH of the whey at the end of the cooking step. The milk with added $CO_2$ had a lower whey pH than the target whey pH than generally used for draining in the inventor's cheesemaking procedure and therefore the whey was drained immediately after the final cook temperature of 37° C. was achieved. As a result, the time from starter addition to whey draining was shorter (P<0.05) for milk with added $CO_2$, but the time from whey draining to the time when a curd pH of 5.6 was achieved (i.e., salt addition) was longer (P<0.05) for the milk with added $CO_2$. This produced a total make time from starter additional to salt addition that was not different (P>0.05) for milk with or without added $CO_2$ (Table 2). St-Gelais et al. (1997) reported a 30 min reduction in total cheese making time due to the preacidification of milk to pH 6.55 with either $CO_2$ or lactic acid. This effect was not observed in the experiments reported herein.

TABLE 2

Mean make times (n = 3), (min.) for control and $CO_2$ treatments.

| Cheesemaking step | Treatment | | |
|---|---|---|---|
| | CONTROL | $CO_2$ | LSD |
| Starter addition to whey draining | 164[a] | 128[b] | 2.9 |
| Whey draining to salt addition | 83[b] | 129[a] | 10.8 |
| Starter addition to salt addition | 247 | 256 | NS |

[a,b]means within column not having a common superscript differ (p < 0.05).

The profile of pH change with time during cheese making for milk with added $CO_2$ was quite different than for milk without added $CO_2$, as shown in FIG. 1. Milk pH starts out low (about 6.0) and decreased very slowly for the first 200 min of the cheese making process for the milk containing approximately 1700 ppm of $CO_2$ (FIG. 1). During this time, lactic acid was being produced by the starter culture and $CO_2$ was being lost from the curd plus whey, with the net effect being a small and slow decrease in pH from about 6.0 to 5.8 over a period of about 200 min. This difference in pH profile during the cheese making process had a major impact on the calcium content of the whey and the cheese.

Whey and Cheese Composition

There were no significant differences in the fat, protein, or NPN contents of the whey from cheese making between control and milk with $CO_2$ (Table 1). If the addition of $CO_2$ did cause casein monomers to move out of the casein micelles along with some calcium phosphate prior to rennet addition, the presence of these caseins outside the micelles did not result in an increase in protein content of the whey.

The control cheese had similar composition to reduced-fat Cheddar cheese produced in other research studies (Johnson et al. (2001) J. Dairy Sci. 84: 1027-1033; Fenelon et al. (1999) J. Dairy Sci. 82:10-22; Chen et al. (1998) J. Dairy Sci. 81:2791-2797; Metzger and Mistry (1995) J. Dairy Sci. 78:1883-1895). The moisture content of the cheese made with $CO_2$ added to the milk was almost 5% higher (P<0.05) than the reduced fat Cheddar made from the same milk without $CO_2$. McCamey et al. ((1995) Milchwissenschaft 50:670-674), also reported that moisture content of their Cheddar cheese made from milk containing $CO_2$ was higher despite modifications to the manufacturing process to reduce moisture levels. However, they did not provide any moisture data in their report, so it is not possible to determine the magnitude of the effect they observed. Johnson et al. ((2001) J. Dairy Sci. 84: 1027-1033) reported that a firmer coagulum at cutting favors higher moisture content. In our study the coagulum at cutting for milk with added $CO_2$ was much firmer than without added $CO_2$ and the final moisture content of the cheese was higher. As expected, the higher moisture content of the cheese in this study caused the concentration of both fat and protein (on a wet basis) to be lower (P<0.05) due to dilution. The fat on dry basis (FDB) in the cheese was not influenced by the use of $CO_2$, but the protein on a dry basis (PDB) was slight lower (P<0.05) for cheese made from milk with added $CO_2$. Further work with measurement of cheese yield would be needed to determine if the lower PDB is an indication of slightly higher protein loss in salt whey during pressing. The higher moisture content of the cheese produced with $CO_2$ added to the milk results in a much higher moisture to protein ratio and would tend to produce a softer cheese (Table 1). The absolute concentration of salt in the cheese made from milk with added $CO_2$ was higher (P<0.05) than cheese made from milk without added $CO_2$, but no difference in the salt concentration in the water phase of the cheese was detected (P>0.05). The final pH values of the cheeses were almost identical (Table 1).

As shown in Table 3, there was a major influence of the addition of $CO_2$ to the milk on the calcium content of the whey and cheese.

TABLE 3

Mean (n = 3) milk, whey, and cheese calcium levels (g/100 g) for control and $CO_2$ treatments.

| Sample type | Treatment | | |
|---|---|---|---|
| | CONTROL | $CO_2$ | LSD |
| Milk | 0.110 | 0.109 | NS |
| Whey | 0.046[b] | 0.066[a] | 0.005 |
| Cheese | 0.789[a] | 0.508[b] | 0.102 |
| [1]Ca/P | 2.58[a] | 1.90[b] | 0.251 |

[a,b]means within row not having a common superscript differ (p < 0.05).
[1]Ca/P = calcium as a percentage of protein in cheese.

The calcium content (Table 3) of the whey was higher (P<0.05) and the calcium content of the cheese was lower (P<0.05) from milk with added $CO_2$. The increase in calcium content of the whey that was observed is consistent with the shift in bound to soluble calcium in milk during acidification as reported by Le Graet and Brulé ((1993) Lait 73:51-60). In another study, Metzger et al. ((2000) J. Dairy Sci. 83: 648-658) acidified milk to pH 6.0 prior to low fat Mozzarella cheese making with acetic and citric acid and reported higher concentrations of calcium in whey and lower concentrations of calcium in cheese. Metzger et al. ((2001) J. Dairy Sci. 84: 1348-1356) reported that reducing the pH of milk prior to cheese making reduced the hardness, initial apparent viscosity, and expressible serum of low fat Mozzarella cheese. While no texture measurements were done on the reduced fat Cheddar cheese made in the current study, the higher moisture content and lower calcium content for the cheese made from milk with added $CO_2$ produced a cheese that was visibly softer than the cheese made without $CO_2$ added to the milk.

Expressible serum content of cheese can be used to reflect the status of water mobility within the structure of the cheese. The mobility of water within the cheese structure could be very important in moisture migration during cooling of 290 kg blocks of Cheddar cheese. The expressible serum content of the reduced fat Cheddar cheese produced in the current study was measured on d 2 after cheese making and was found to be much lower (P<0.05) in the cheese that was produced from milk with added $CO_2$ (Table 4).

TABLE 4

Mean (n = 3) cheese expressible serum at day 2 (g/100 g cheese) for control and $CO_2$ treatments.

| Sample type | Treatment | | |
|---|---|---|---|
| | CONTROL | $CO_2$ | LSD |
| Cheese | 7.487[a] | 0.931[b] | 3.66 |

[a,b]means within row not having a common superscript differ (p < 0.05).

This low expressible serum content may have an impact on water mobility within large blocks of Cheddar cheese during cooling. The results provided herein are consistent with the results of Metzger et al. ((2001) J. Dairy Sci. 84: 1348-1356), who reported that reduction in milk pH prior to cheese making produced Mozzarella cheese with a lower amount of expressible serum. It is normal for expressible serum content of cheese to decrease with time during refrigerated storage (Guo and Kindstedt (1995) J. Dairy Sci. 78:2099-2107) and after about 2 wk of storage of Mozzarella cheese, the amount of expressible serum is near zero. Guo et al. ((1997) J. Dairy Sci. 80:3092-3098) also reported that the amount of expressible serum in the structure of cheese immediately after manufacture was reduced by the addition of salt. These changes in the mobility of water can influence, or are at least related to, functional properties such as meltability of cheese. McMahon et al. ((1999) J. Dairy Sci. 82:1361-1369) described water partitioning in Mozzarella cheese and its relationship to cheese meltability. They found that the amount of chemically bound water in cheese remained constant during refrigerated storage of cheese but that there was an increase in entrapped water and a decrease in expressible water with increasing age of the cheese and that these changes were related to time dependent changes in cheese functionality. Assuming that a similar behavior happens in Cheddar cheese, the amount of water bound to protein probably remained constant in our cheese but the $CO_2$ treatment caused a large decrease in the expressible water (i.e., easily movable) and an increase in the entrapped water within the structure of the reduced fat Cheddar cheese. This increase in entrapped water may have an influence on moisture migration within the cheese during cooling.

Temperature Induced Changes in Cheese pH and Moisture During Cooling Cheese pH.

Slabs of cheese were placed in an apparatus designed to move moisture upward from position 1 to position 7 within a slab of cheese. Position 7 was the cold end position of the cheese and as the cheese is gradually raised out of the warm (27° C.) water over a period of 36 h, moisture migrates against the force of gravity from the bottom to the top of the cheese slab. The temperature gradient in the slab of cheese may also produce a gradient of pH within the slab of cheese. There was a trend (P=0.065) for cheese pH (Table 5) to increase from the bottom to the top of the slab of cheese but the total range of difference in pH (i.e., 4.88 to 5.03) was small. No direct influence of $CO_2$ on cheese pH was detected (Table 5), but there was a position by $CO_2$ treatment (P<0.01) interaction (Table 5).

Generally, there was almost no change in pH with position in the slab for the control and there was a slight trend for pH to increase from the bottom to the top of the slab for the cheese made from milk with $CO_2$. The area of the slab of cheese that was cooled the fastest (i.e., position 7) had the highest pH and the area of the slab that was cooled the slowest (i.e., position 1) had the lowest pH.

Cheese Moisture.

Figure 2:
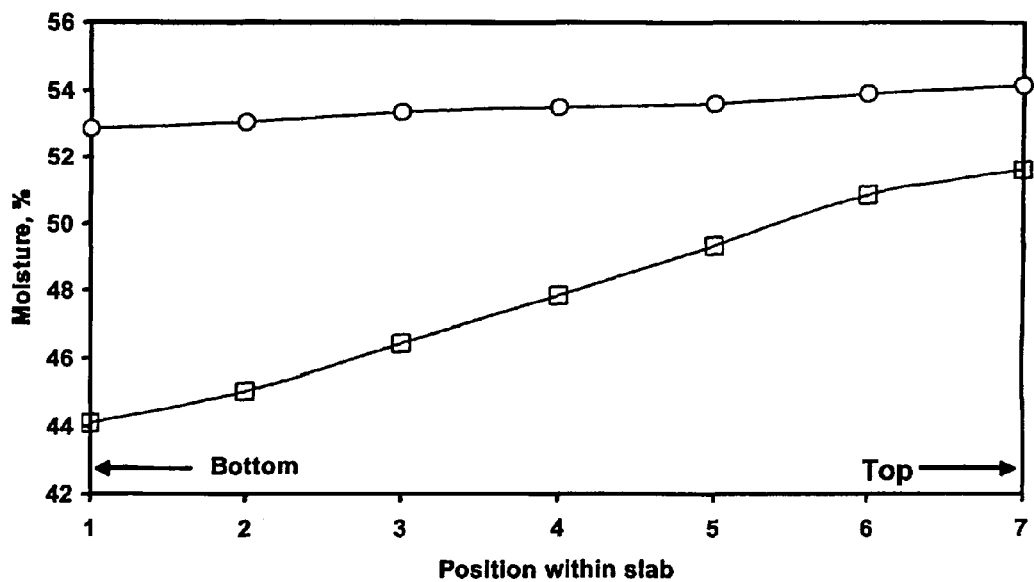
FIG. 2 shows cheese moisture as a function of position within the cheese slab (n=3), position 1=bottom 2.54 cm of cheese slab and position 7=top 2.54 cm of cheese slab. Control (□), average moisture of 3 replication and $CO_2$-treated (○), average moisture of 3 replications.

There was a large impact (Table 5) of $CO_2$ treatment (P<0.01) and a significant position by $CO_2$ treatment interaction on moisture migration in reduced fat Cheddar cheese (FIG. 2). The range of moisture migration across the seven positions within the slab of cheese for the control was about 7.47%, while the moisture migration in the cheese made from milk containing $CO_2$ was approximately 1.3%. Clearly, the use of $CO_2$ reduced (ca. 80% reduction) the mobility of water during the cooling of the cheese and prevented the majority of moisture migration. This result is even more impressive when one considers the fact that the moisture content of the reduced fat Cheddar made from the milk with added $CO_2$ contained 5.76% more moisture (Table 1) and had a significantly higher moisture to protein ratio than the control (Table 1). The reduction in the temperature induced moisture migration is consistent with the large reduction in expressible serum in the cheese that was produced by the addition of $CO_2$ to the milk prior to cheese making. Thus, it appears that addition of a sufficient quantity of $CO_2$ to milk to reduce the pH to about 6.0 prior to cheese making, would significantly reduce moisture migration and the associated quality defects in 290 kg blocks of Cheddar cheese.

In some instances, the large increase in moisture due to $CO_2$ addition to milk may not be desirable from a product characteristic point of view. During this study, no attempt was made to modify the cheese making procedure to produce cheese with lower moisture content from $CO_2$ containing milk, but traditional modifications of the cheese making procedure should be able to bring the moisture content of cheese made from milk containing $CO_2$ closer to that of cheese made from milk without $CO_2$. However, if it was possible to carry a higher moisture level in the cheese and achieve acceptable cheese quality, then this would provide some yield benefit. This may be more feasible for higher moisture Cheddar varieties that are not aged for long periods of time.

TABLE 5

ANOVA (degrees of freedom, means squares, probabilities (in parenthesis) and $R^2$) for $CO_2$ treatment, week of cheese making, and position within cheese slab on percent moisture and pH of cheese exposed to a temperature gradient during cooling.

| Factor | df | Moisture | pH | Variable type |
|---|---|---|---|---|
| TR[1] | 1 | 328.94 (p < 0.01) | 0.0004 (0.749) | Category |
| W[2] | 2 | 23.30 (p < 0.01) | 0.0068 (p < 0.01) | Fixed |
| P[3] | 1 | 98.36 (p < 0.01) | 0.0373 (0.065) | Continuous |
| TR × W | 2 | 7.00 (p < 0.01) | 0.0028 (p < 0.01) | |
| P × W | 2 | 0.03 (0.547) | 0.0002 (0.495) | |
| P × TR | 1 | 51.12 (p < 0.01) | 0.0131 (p < 0.01) | |
| P × TR × W | 2 | 0.57 (p < 0.01) | 0.0027 (p < 0.01) | |
| Error (for P, P × TR, P × W, TR × W, and P × TR × W) | 30 | 0.045 | 0.0003 | |
| $R^2$ | | 0.998 | 0.900 | |

[1]TR = Treatment.
[2]W = Week.
[3]P = Position.

Thus, addition of hydrocolloids and denatured whey proteins to milk prior to cheese making increased cheese moisture content but did not reduce temperature induced moisture migration in Cheddar cheese during cooling. Addition of $CO_2$ to milk prior to cheese making made a major (ca. 80%) reduction in temperature induced moisture migration in reduced-fat Cheddar cheese during cooling. The use of $CO_2$ also caused an increase (ca. 5%) in cheese moisture in reduced-fat Cheddar cheese. Despite the higher moisture content, the temperature induced movement of moisture was still dramatically smaller for the reduced-fat Cheddar cheese made with $CO_2$ added to the milk. The $CO_2$ produced a reduction in milk pH to about 5.9 to 6.0 and caused a movement of calcium out of casein micelles prior to rennet addition. The use of $CO_2$ in the milk did not interfere with normal acid production by the starter culture and the final cheese pH was not influence by the addition of $CO_2$. The same effects upon calcium-casein micelle equilibrium happen when $CO_2$ is added to milk in preparation for making Mozzarella cheese. These effects are also the basis for the desirable impact of $CO_2$ acidification of milk prior to rennet addition on the water holding capacity and functionality of Mozzarella cheese.

EXAMPLE 2

$CO_2$ Cheese Making Procedures and the Impact of $CO_2$ on Cheese Yield and Recovery of Components in Cheddar Cheese Materials and Methods Experimental Design and Statistical Analysis Two 18 kg blocks of full-fat Cheddar cheese were. One block was made from milk with added $CO_2$ and another control block was made from milk without added $CO_2$. Cheese was made on three different days (using a different batch of milk each day) over a one-week period. A one-way ANOVA was used to determine if there was an impact of $CO_2$ on the composition and yield of the cheese. The least significant difference ($P \leq 0.05$) test was used to compare treatment means if the F-test for the statistical model was significant ($P \leq 0.05$). The PROC GLM procedure of SAS was used for all data analysis (SAS version 8.02, 1999-2001, SAS Institute Inc., Cary, N.C.)

Milk Processing and Cheese Manufacture

Milk processing and cheese manufacture were completed on the same day. Each day, raw whole bovine milk was received from the Cornell University dairy farm. The raw whole milk was pasteurized with a plate heat exchanger at 72° C. and a holding time of 15 sec. The pasteurized milk was then cooled to 4° C. utilizing the regeneration and cooling sections of the system. Carbonated milk was collected after about 250 kg of pasteurized milk was collected for the control treatment. A stainless steel sparger (7 μm) was inserted in-line after the cooling section of the pasteurization system. An additional 8 m of 2.54-cm diameter stainless steel pipe, with a sanitary conical-seat flow controlling valve at the end, were added after the point of $CO_2$ injection to allow 15 s of holding time for $CO_2$ incorporation into the cold pasteurized milk. A pressure gauge was located in-line at the point of injection and another just before the flow control valve. Carbonation conditions ($CO_2$ flow at 1.13 $m^3$/h with 172 kPa back pressure at the flow control valve) were equilibrated with water (16.6 L/min) before milk was started through the pasteurization system. Milk was carbonated to approximately 1650 ppm to achieve a $CO_2$ level of about 1600 ppm in the cheese vat, which produced a milk pH of 5.9 at 31° C. The pH of 5.9 is between the two pH levels reported by Metzger et al. (2001) where increased soluble nitrogen levels were observed.

All weights for cheese making including milk, whey, salt whey, cheese, and samples were weighed to the nearest gram (Model PE24, Mettler Instrument Co., Highstone, N.J.). After pasteurization, approximately 240 kg of milk was weighed and placed into the control vat. The second vat was filled with about 240 kg of pasteurized and carbonated milk. Cheese making for these two vats was conducted simultaneously. The milk in each vat was heated to 31° C., with agitation (Model 4MX; Kusel Equipment Co., Watertown, Wis.). The milk was ripened for 45 min at 31° C. after the starter culture (911 DVS pellets, Chr. Hansen Inc., Milwaukee, Wis.) was added at a concentration of 0.27 g/kg of milk. When ripening was complete, annatto color (AFC WOS 550, Rhodia Inc., Madison Wis.) was added (0.0033 mL/kg of milk) to each vat. The ripened milk, 31° C., was coagulated with double strength chymosin (0.1 mL/kg of milk; Chymax Extra, Chr. Hansen Inc., Milwaukee, Wis.). The chymosin was diluted, in 200 mL of water processed by reverse osmosis, immediately before addition to the milk. After 30 min, the coagulum was cut (1.2 cm wire knives) and the curds and whey were not stirred for 5 min. After 5 min, the curds and whey were stirred gently without added heat for 10 min. The temperature was increased from 31 to 33° C. over 15 min and then from 33 to 38° C. over an additional 15 min. The curds and whey were continuously stirred and a temperature of 38° C. maintained until the target whey draining pH of 6.35 was attained. When the whey was drained, the curds were piled and allowed to knit together for 15 min. The large slab of curd was cut into two smaller slabs then turned. The two curd slabs were stacked after 15 min. Curd slabs were maintained at 38° C., piled two high, and turned over every 15 min throughout the Cheddaring process. Curd slabs were milled when the curd pH reached 5.30. Salt was added at 2.7% of the curd weight. The salt was divided equally into three portions. The milled curds were dusted with a small amount of the first portion of salt, then stirred for 2 min and allowed to sit for 10 min. The remainder of the first portion of salt was then added, the curds stirred, and then the curds were allowed to sit for 10 min. The curds were salted with the two other portions of salt in 10 min intervals. The salted, milled curds were placed in a 18 kg capacity stainless steel Wilson hoop and pressed in an A-frame press (Model AFVS, Kusel Equipment Co., Watertown, Wis.) for 30 min at 70 kPa. Pressing was continued overnight, about 17 h, at 420 kPa. The cheese blocks were vacuum packaged and placed in a 4° C. cooler for 24 h before being placed in a cooler set at 6° C. for aging.

Sampling and Sample Preparation

Sampling.

Raw whole milk at 4° C. was mixed and sampled immediately before pasteurization. Pasteurized control and $CO_2$ treated milks were collected after heating in the cheese vat to 31° C. prior to starter addition. The whey collected from the start of curd draining to the end of draining was placed in a separate vat for each treatment and sampled for $CO_2$ analysis. Additional whey collected throughout Cheddaring was added to the vats containing the whey. When all the whey from each vat was collected, the whey was heated to 38° C. and mixed to assure uniform composition before a sample was taken for compositional analysis and used in mass-balance calculations. Salt whey was collected and weighed separately after milling at the vat and mixed with the press whey, which was weighed. Press whey was collected during pressing by placing the hooped curds in large 8-mil plastic bags (model number S-5851, Uline, Waukegan, Ill.). Hot water was run on the outside of the bags to liquefy fat that may have solidified on the inside surface of the bag during pressing and all of the whey was removed from the bags. A 1-cm thick by 28 cm by 19 cm cross sectional slice from the center of the rectangular 18-kg block of cheese was removed immediately after the block was removed from the press. This slice of cheese was used for compositional analysis and was vacuum-packaged and cooled to 4 C prior to analysis.

Sample Preparation.

Liquid samples were placed in 59-mL snap lid vials and either analyzed fresh or stored frozen at $-40°$ C. Frozen liquid samples were thawed in a microwave oven in a manner that kept the sample temperature below 10 C. Cheese slices were cut into 2-cm pieces then ground (Model 31BL92, Waring, New Hartford, Conn.) in 2 to 3 mm pieces and packed into 59-mL snap lid vials (Capital Vial, Inc., Fultonville, N.Y.) with no head space and either analyzed fresh or held frozen at $-40°$ C. before analysis. Frozen cheese samples were thawed overnight at 4° C. prior to analysis.

Standard Plate, Coliform, and Somatic Cell Counts

Standard plate and total coliform counts of pasteurized whole milks were determined by standard methods (Marshall, 1992; 6.2 and 7.8). Somatic Cell Counts (SCC) of raw whole milk (AOAC 2000; 17.13.01, 978.26) were determined using a fluorimetric method (Milk-Scan Combi 4000, Integrated Milk Testing; A/S N. Foss Electric Hillerød, Denmark) by a New York State licensed commercial laboratory (Dairy One, Ithaca, N.Y.).

Chemical Analyses

Milk, Whey, and Salt Whey Composition.

Fat, total salt (TS), total nitrogen (TN), nonprotein nitrogen (NPN), noncasein nitrogen (NCN) content of the milk, whey, and salt whey were determined using ether extraction (AOAC, 2000; 33.2.26, 989.05), forced air oven drying (AOAC, 2000; 33.2.44, 990.20), Kjeldahl (AOAC, 2000; 33.2.11, 991.20), Kjeldahl (AOAC, 2000; 33.2.12, 991.21), Kjeldahl (AOAC, 2000; 33.2.64, 998.05), respectively. Crude protein (CP) was calculated by multiplying total nitrogen by 6.38. The calcium content was determined using atomic absorption (Metzger et al., 2000). $CO_2$ content of the milk and whey was determined (Ma et al., 2001) using a $CO_2$ analyzer (MOCON Pac Check 650, MOCON, Minneapolis, Minn.). The Volhard method (Marshall, 1992; 15.5.B) was used to determine the salt content in the salt whey, using a 0.5-g test portion. Milk, whey and salt whey compositions were determined in triplicate with the exception of calcium and $CO_2$, which were determined in duplicate.

Cheese Composition and pH.

Fat content was determined using the Babcock method (Marshall, 1992; 15.8.A). Cheese moisture was determined gravimetrically by drying 2 g of cheese in a forced-air oven at 100° C. for 24 h (AOAC, 2000; 33.2.44, 990.20) using 2 g of cheese. Salt content was determined using the Volhard method (Marshall, 1992; 15.5.B). The Kjeldahl method employing 1 g of cheese, was used to determine total nitrogen (Lynch et al., 2002). The cheese calcium content was determined by atomic absorption (Metzger et al., 2000).

Cheese pH was measured using a Xerolyt combination electrode (Model HA405; Mettler Toledo, Columbus, Ohio) and an Accumet pH meter (Model AR 25, Fisher Scientific, Pittsburgh, Pa.) after tempering to 23° C. All analyses were carried out in duplicate except total nitrogen, moisture, and fat which were performed in quadruplicate.

Component Recoveries

Fat, crude protein, calcium, total milk solids, and added salt recoveries were determined by multiplying the weights (determined to the nearest g) of milk, whey, salt whey, and cheese by the compositions determined by chemical analysis then dividing by the total weight of either fat, crude protein, calcium, total milk solids, or added salt and multiplying by 100. Total milk solids recovery calculations did not include salt in the salt whey or in the cheese. If the mean actual total unadjusted recoveries between treatments for the component were not significantly different (P>0.05), then the recoveries were adjusted by dividing the actual recoveries by the mean total recovery for each day of cheese making and multiplying by 100.

Yield and Yield Efficiency

Actual cheese yields were calculated by ((cheese weight+ curd sample weight)/(milk weight−milk sample weight))× 100. Moisture and salt adjusted yield was calculated accordingly (actual yield×(100−(cheese moisture content+cheese salt content)))/(100−(37+1.5)). The moisture and salt adjustment allows for comparison between treatments. Cheese yield efficiency was calculated by dividing the adjusted yield by the theoretical yield and multiplying by 100. Both Van Slyke and Barbano theoretical cheese yield formulas (Neocleous et. al., 2002) were used for a cheese yield efficiency calculation.

The Van Slyke cheese yield formula for Cheddar cheese was calculated according to the following formula: yield= (((0.93×percent fat in milk)+(percent casein in the milk− 0.1))×1.09)/(1−(target cheese moisture/100)). The Barbano formula for Cheddar cheese differs from the Van Slyke in that the nonfat solids of the whey were used to determine the nonfat whey solids retained in the water phase of the cheese (Barbano, 1996). The Barbano formula is useful when manufacturing a preacidified cheese because it can compensate for the loss of calcium into the whey. Theoretical Cheddar cheese yield using the Barbano formula was calculated using the following formula: yield=(A+B+C)/(1−((target cheese moisture+target cheese salt)/100)) where A=(0.93×percent fat in milk), B=(percent casein in milk−0.1)×(calcium phosphate retention factor), C=((((A+B)/(1−(actual cheese moisture percent/100)))−(A+B))×(percent nonfat whey solids/100))× (solute exclusion factor). The calcium phosphate retention factors used in this study for the control and $CO_2$ treatments were 1.092 and 1.082, respectively. The same calcium phosphate retention factor for the control theoretical yield calculation was used by Neocleous et al. (2002). The lower calcium phosphate retention factor used for $CO_2$ treatment theoretical yield calculation was obtained by plotting calcium retention factor data (acetic acid treatments) of Metzger et al. (2000) and using the second order polynomial equation (solute exclusion factor=−0.0333($x^2$)+0.4333(x)−0.316) to compute a calcium retention factor to use for the milks (mean milk pH of 5.93) with added $CO_2$, where x=milk pH. The solute exclusion factor of 0.6941 used by Neocleous et al. (2002) was also used in this study for both the control and added $CO_2$ theoretical yield formulas.

Results

Milk Composition and Quality

Milk composition data are presented in Table 6. The mean casein as a percentage of true protein (TP) was about 83%, which in turn gave rise to a mean casein to fat ratio of 0.66. The pH of the milk at 31° C. before $CO_2$ addition (Table 6) was normal for good quality milk. The standard plate counts of the control and preacidified milks of 440 and 1150 cfu/mL were low and not significantly different. The coliform count was <10 cfu/mL for both treatments. The mean SCC of the milks used each day for cheese making are shown in Table 6.

TABLE 6

Pasteurized control milk composition and pH for each day of cheese making.

| Component | Day of cheese making | | |
|---|---|---|---|
| | 1 | 2 | 3 |
| Fat, % | 3.44 | 3.42 | 3.35 |
| Crude Protein, % | 2.90 | 2.92 | 2.93 |
| Non-Casein Protein[1], % | 0.66 | 0.67 | 0.66 |
| Nonprotein Nitrogen[2], % | 0.20 | 0.18 | 0.19 |
| TS, % | 11.88 | 11.75 | 11.74 |
| Casein/Total Protein[3], % | 82.96 | 82.26 | 82.99 |
| Casein/fat, % | 0.65 | 0.66 | 0.68 |
| Calcium, % | 0.105 | 0.106 | 0.106 |
| pH[4] | 6.63 | 6.68 | 6.64 |
| SCC, per mL | 268,000 | 260,000 | 226,000 |

[1]NCN = noncasein nitrogen × 6.38.
[2]NPN = NPN × 6.38.
[3]CN/TP = (((CP − NCN)/((TN − NPN) × 6.38)) × 100).
[4]Measured at 31° C.

The $CO_2$ levels of the control and $CO_2$ treated milks were significantly different after $CO_2$ addition (Table 7). The target milk pH of about 5.9 was achieved (Table 8) by the addition of about 1600 ppm of $CO_2$ (Table 7).

TABLE 7

Mean (n = 3) carbon dioxide content (ppm) of the control and $CO_2$ treated milk and whey.

| | Control | $CO_2$ treated | LSD | SEM |
|---|---|---|---|---|
| | ppm | | | |
| Milk | 88[b] | 1615[a] | 77 | 19.7 |
| Whey at draining | 85[b] | 1000[a] | 115 | 29.4 |

[a,b]Means within a row that do not share a common superscript differ (P ≤ 0.05).
LSD = least significant difference;
SEM = standard error mean.

TABLE 8

Mean (n = 3) milk, whey, and curd pH during cheese making.

| | Control | $CO_2$ | LSD | SEM |
|---|---|---|---|---|
| Milk | 6.65[a] | 5.93[b] | 0.054 | 0.014 |
| Coagulant addition[1] | 6.57[a] | 5.93[b] | 0.052 | 0.013 |
| Drain[2] | 6.35[a] | 5.96[b] | 0.074 | 0.019 |
| Mill[3] | 5.30 | 5.30 | NS | 0.000 |

[a,b]Means within a row that do not share a common superscript differ (P ≤ 0.05).
[1]Ripened (45 min) milk sample;
[2]Whey sample;
[3]Curd sample;
LSD = least significant difference;
SEM = standard error mean.

Effect of $CO_2$ on Cheese Making

Figure 3:
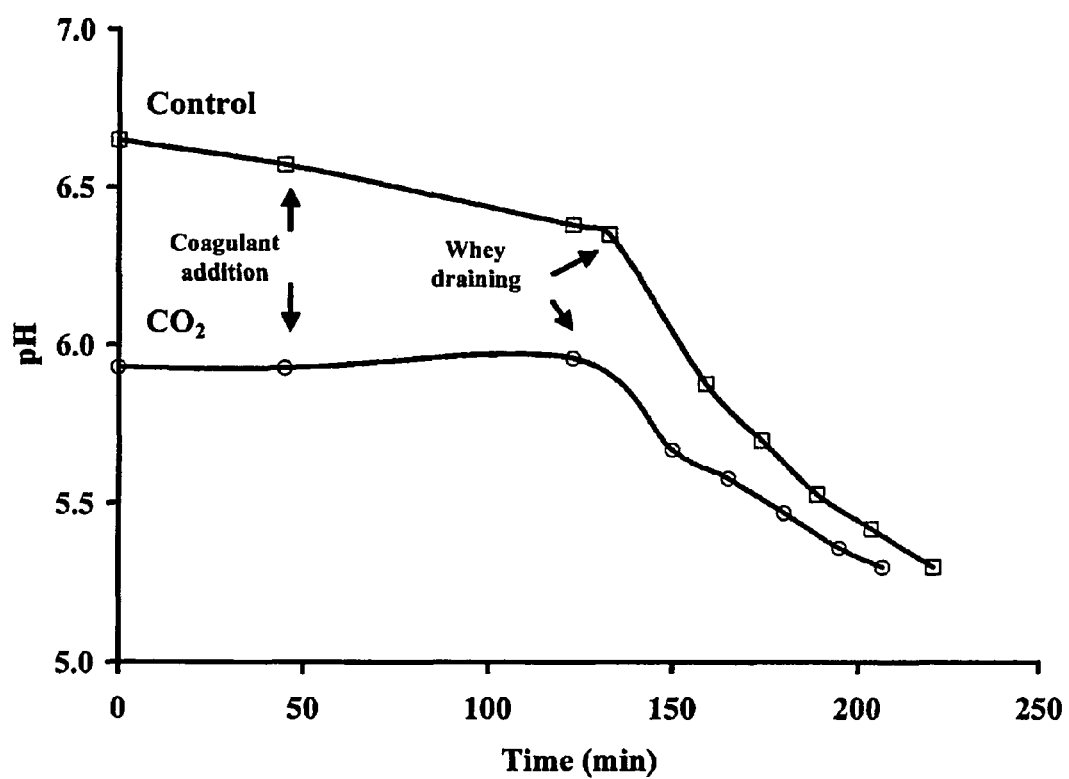
FIG. 3 graphically illustrates the mean (n=3) temporal pH pattern of control (squares) and $CO_2$-treated (circles) cultures during cheese making. Samples at times 0 and 45 min were milk, samples from 100 to 140 min were whey, and samples after 140 min were curd.

The mean (n=3) temporal patterns of pH for the control and $CO_2$ treatment during cheese making are shown in FIG. 3. The milk pH before starter culture addition, at coagulant addition, and of the whey at draining was higher (P≤0.05) for the control than the $CO_2$ treatment (Table 8). The slope of the control pH curve from 0 to 120 min (FIG. 3) was negative whereas the $CO_2$ treatment pH was substantially constant over the same period. The downward slope of the control pH curve was expected because the starter culture was producing lactic acid during the 45 min of ripening. Although the starter culture growing in the milk of the $CO_2$ treatment was producing lactic acid, the pH of the whey did not change much from the initial pH of the milk until after about 130 min into cheese making because the milk was also losing $CO_2$. The time from coagulant addition to whey draining (Table 9) was shorter for the $CO_2$ treatment (P≤0.05). Moreover, if $CO_2$ produced the milk pH decrease usually caused by lactic acid during ripening, then the lactic acid content of the sweet whey collected at draining would be reduced. The $CO_2$ remaining in the whey could be removed with a vacuum chamber. This might improve the quality of whey products in certain applications. The separate impacts of lactic acid and $CO_2$ on the pH observed for the $CO_2$ treatment (FIG. 3) cannot be determined from the data collected.

The total make time was shorter with the milk preacidified with $CO_2$ (Table 9) mostly due to the decrease in cooking time before whey draining. The target whey draining pH of 6.35 at the end of cooking was surpassed by the $CO_2$ treatment when the curd reached the final cooking temperature (38° C.), while the control required an additional 10 min of stir-out time at 38 C before the target pH was achieved (Table 9). The curds from the $CO_2$ treatment and control were both milled at pH 5.3. There was no significant difference in time from drain to mill between the control and $CO_2$ treatment (Table 9). A shorter (P<0.05) total make time of the $CO_2$ treatment was also reported by St-Gelais et al. (1997) using $CO_2$ to preacidify milk to pH 6.56 prior to cheese making, however, they reported a similar time from cut to whey draining and a 30 min shorter Cheddaring time.

TABLE 9

Mean (n = 3) Cheddar cheese make times for control and $CO_2$ treated cheeses.

| | Control | $CO_2$ | LSD | SEM |
|---|---|---|---|---|
| | minutes | | | |
| Coagulant addition to drain | 88[a] | 78[b] | 2.6 | 0.67 |
| Drain to mill | 88 | 83 | NS | 1.72 |
| Total | 176[a] | 161[b] | 8.6 | 2.20 |
| Stir out | 10[a] | 0[b] | 0.0 | 0.00 |

[a,b]Means within a row that do not share a common superscript differ (P ≤ 0.05).

The effect of $CO_2$ was visually apparent during cheese making. Preacidification with $CO_2$ produced a firmer coagulum that could be detected by touch and by the resistance of the coagulum when cut with wire knives. Other investigators have observed more rapid coagulation (Montilla et al., 1995; St-Gelais et al., 1997) and Van Slyke et al. (1903) observed that the rennetability of milk that had been heat treated above 85° C. was restored with the addition of $CO_2$ to milk prior to cheese making. After cutting, the curds of the $CO_2$ treated material floated to the surface with increasing temperature during cooking whereas the curds of the control settled to the bottom if stirring was not constant. Floating curds may require a change in procedure if a portion of the whey is normally drained from the cheese vat through an outlet located about half-way between the surface of the whey and the bottom of the vat (i.e., predraining). In the case of floating curds, predraining could be accomplished by draining a portion of the whey through the outlet located at the bottom of the cheese vat. If horizontally stirred cheese vats were used to manufacture cheese from milk containing $CO_2$, the thickness of the floating curd mass may be an issue that needs to be investigated with regard to curd integrity and fines. The fact that curds can be made to float in this process provides an opportunity to think about a different design of cheese vat and curd handling system that could reduce curd shattering.

Whey, Salt Whey, and Cheese Composition

Whey and Salt Whey Composition.

A major portion of the $CO_2$ added to the milk was removed with the whey at draining (Table 7). Means and composition differences of whey and salt whey due to $CO_2$ treatment are reported in Table 10. $CO_2$ treatment resulted in a higher ($P \leq 0.05$) fat content in the whey and salt whey. The calcium content was higher ($P \leq 0.05$) in the whey from the $CO_2$ treatment and calcium content in the salt whey was lower ($P \leq 0.05$) than the control. There was no significant difference in whey CP content but there was a slight increase in the CP content of the salt whey. There was substantially less salt in the salt whey of the $CO_2$ treatment than the control (Table 10). St-Gelais et al. (1997) reported higher ($P < 0.05$) fat content in the control whey versus the $CO_2$ treatment (0.54 vs. 0.35%, respectively). The level of fat in whey reported by St-Gelais et al. (1997) would normally be associated with much lower fat recovery in cheese (Barbano and Sherbon, 1984) and does not seem consistent with the high fat recovery in the cheese (91.93 and 98.54%, respectively) reported in the same paper. The same authors did not detect a significant difference in the ash content of the whey, and salt whey composition was not reported.

TABLE 10

Mean (n = 3) whey, salt whey, and cheese composition.

| Component | Control percent | $CO_2$ treated percent | LSD | SEM |
|---|---|---|---|---|
| Whey | | | | |
| Fat | 0.27[b] | 0.37[a] | 0.058 | 0.015 |
| CP[1] | 0.85 | 0.86 | NS | 0.020 |
| NPN[2] | 0.25 | 0.25 | NS | 0.005 |
| TP[3] | 0.60 | 0.60 | NS | 0.019 |
| TS | 6.71[b] | 6.87[a] | 0.098 | 0.025 |
| Calcium | 0.05[b] | 0.07[a] | 0.002 | 0.0004 |
| Salt whey | | | | |
| Fat | 1.28[b] | 4.07[a] | 1.174 | 0.299 |
| CP | 1.08[b] | 1.10[a] | 0.023 | 0.006 |
| NPN | 0.40 | 0.40 | NS | 0.008 |
| TP | 0.68[b] | 0.71[a] | 0.024 | 0.006 |
| TS | 16.15 | 15.73 | NS | 0.210 |
| Salt | 8.73[a] | 6.73[b] | 0.856 | 0.218 |
| Calcium | 0.21[a] | 0.16[b] | 0.023 | 0.006 |
| Cheese | | | | |
| Fat | 34.19[a] | 32.83[b] | 1.024 | 0.261 |
| FDB[4] | 54.12[a] | 52.67[b] | 0.859 | 0.219 |
| CP | 23.72 | 24.02 | NS | 0.213 |
| PDB[5] | 37.49 | 38.09 | NS | 0.423 |
| Moisture | 36.84 | 37.67 | NS | 0.285 |
| MNFS[6] | 55.97 | 56.08 | NS | 0.246 |
| Salt | 1.44[b] | 2.24[a] | 0.119 | 0.030 |
| Salt-in-the-moisture | 3.92[b] | 5.96[a] | 0.385 | 0.098 |
| Calcium | 0.69[a] | 0.52[b] | 0.035 | 0.009 |
| Calcium/CP (×100) | 2.91[a] | 2.15[b] | 0.185 | 0.047 |

[a,b]Means within a row that do not share a common superscript differ ($P \leq 0.05$).
[1]CP = crude protein (CP = total nitrogen × 6.38).
[2]NPN = nonprotein nitrogen × 6.38.
[3]TP = true protein (TP = CP − NPN).
[4]FDB = fat on a dry basis.
[5]PDB = protein on a dry basis.
[6]MNFS = moisture in the nonfat substance.

Ultrafiltration is often used to fractionate whey before spray drying. Whey proteins, α-lactalbumin in particular, have been implicated in membrane fouling (Tong et al., 1989). In addition to protein, soluble calcium has been found to reduce flux (Ramachandra Rao et al., 1994). With respect to fouling due to protein, there was no significant difference in crude protein content of the whey (Table 10) between the control and the $CO_2$ treatment. The calcium content of whey from the $CO_2$ treatment (Table 10) was higher ($P \leq 0.05$). Experiments can determine if the whey from $CO_2$ preacidification differs in ultrafiltration flux from that of typical Cheddar cheese whey. From the current literature it was unclear whether the higher calcium content of the whey from the $CO_2$ treatment would impact the process of dehydration during spray drying, the rehydration of whey powder, or functionality of the whey protein concentrate compared to the control.

Cheese Composition and pH.

No difference ($P \leq 0.05$) in cheese crude protein, protein-on-a-dry basis, moisture, or moisture-in-the-nonfat substance was detected between the control and $CO_2$ treatment. The fat content of the control cheese was higher ($P \leq 0.05$) than the $CO_2$ treated cheese (Table 10). The $CO_2$ treatment cheese contained less calcium (Table 10) due to the reduced milk pH prior to rennet addition (Table 8). The calcium content of the control was similar to the value of 0.721%, standard error was 10.770, listed in the UDSA National Nutrient Database (USDA, 2003), but the $CO_2$ treatment calcium content was lower. Additional experiments can determine if the lower calcium content of the $CO_2$ treatment cheese could reduce calcium lactate crystal formation during aging. The control cheese pH, 5.00, was lower ($P \leq 0.05$) than the $CO_2$ treatment cheese pH, 5.09. The largest difference ($P \leq 0.05$) between the control and treatment cheeses was salt content. The control cheese had a salt content of 1.44% compared to 2.24% for the $CO_2$ treatment. Thus, the salt-in-the-moisture content for the $CO_2$ treatment (5.96%) was higher than the typical value (about 4.6%) for aged Cheddar. This could impact enzymatic changes during aging.

Component Recoveries

The actual total recoveries (i.e., accountability) for all components were not influenced by the $CO_2$ treatment. Actual total calcium, crude protein, fat, milk solids, and added salt recoveries for cheeses made from milk without and with added $CO_2$ were 101.91 and 102.13%, 101.89 and 101.39%, 100.60 and 99.11%, 99.94 and 99.24%, 96.54 and 99.81%, respectively. Therefore, the actual recoveries were adjusted as described in the materials and methods section of this paper (see Table 11).

TABLE 11

Adjusted mean (n = 3) calcium, fat, CP, milk solids, and added salt recovery in whey, salt whey, and cheese.

| | Control percent | $CO_2$ percent | LSD | SEM |
|---|---|---|---|---|
| Calcium recovery | | | | |
| Whey | 37.27[b] | 54.28[a] | 1.502 | 0.382 |
| Salt whey | 3.55[a] | 2.44[b] | 0.362 | 0.092 |
| Cheese | 59.07[a] | 43.38[b] | 1.669 | 0.425 |
| Fat recovery | | | | |
| Whey | 6.98[b] | 9.79[a] | 1.708 | 0.435 |
| Salt whey | 0.68[b] | 1.89[a] | 0.391 | 0.100 |
| Cheese | 93.08[a] | 87.57[b] | 1.921 | 0.489 |
| CP recovery | | | | |
| Whey | 25.48 | 25.65 | NS | 0.448 |
| Salt whey | 0.66 | 0.60 | NS | 0.030 |
| Cheese | 74.11 | 73.51 | NS | 0.462 |
| Milk solids recovery | | | | |
| Whey | 50.55[b] | 52.00[a] | 1.132 | 0.288 |
| Salt whey | 1.15 | 1.24 | NS | 0.069 |
| Cheese | 48.65[a] | 46.41[b] | 1.281 | 0.326 |

TABLE 11-continued

Adjusted mean (n = 3) calcium, fat, CP, milk solids,
and added salt recovery in whey, salt whey, and cheese.

|  | Control | $CO_2$ | LSD | SEM |
|---|---|---|---|---|
|  | percent |  |  |  |
| Salt recovery |  |  |  |  |
| Salt whey | 55.28$^a$ | 37.62$^b$ | 4.981 | 1.269 |
| Cheese | 43.04$^b$ | 64.05$^a$ | 5.748 | 1.464 |

$^{a,b}$Means within a row that do not share a common superscript differ (P ≤ 0.05).

Calcium Recovery.

More (P≤0.05) calcium was recovered in the whey of the milk treated with $CO_2$ (Table 11) than in the control (54.28 vs. 37.27%, respectively). Mean calcium recoveries were higher (P≤0.05) in the control salt whey and cheese compared to the $CO_2$ treatment (Table 11). Adding $CO_2$ to milk lowers the pH (Table 8) and causes an increase in calcium and phosphate concentrations in the serum phase of milk (Law and Leaver, 1998). The higher milk serum calcium content at coagulant addition was the likely cause for the firmer coagulum of the $CO_2$ treatment and the higher calcium content of the $CO_2$ treatment whey. The lower calcium recovery in the cheese reduced cheese calcium content from 0.69 to 0.52% (Table 10) was also due to the increased soluble calcium at coagulant addition.

Fat Recovery.

$CO_2$ treatment cheeses had a lower (P≤0.05) fat recovery in the cheese than the control cheeses (Table 11). Almost 10% of the total milk fat was recovered in the whey from the $CO_2$ treated milk compared to about 7% in the control. The fat recovery for the control was consistent with the assumption of 93% fat recovery in the Cheddar cheese theoretical yield formulae described in the material and methods section. The mean fat recovery in the salt whey of the $CO_2$ treatment was more than twice that of the control (Table 11). Although the difference in fat content between the control and the $CO_2$ treatment was greater for the salt whey than the whey (Table 10), more fat was lost in the whey than in the salt whey, as shown in Table 11.

The lower pH of the milk with $CO_2$ added prior to rennet addition changes the rate and firmness of milk coagulation. The coagulation for the milk with added $CO_2$ was faster and firmer in this study. Johnson et al. (2001) varied coagulation firmness in a controlled study of composition and yield of 50% reduced fat Cheddar cheese and found an increase in fat loss with increased coagulation time and firmness at cut. Johnson et al. (2001) indicated that a coagulation that is cut soft will lose less fat and serum than a coagulation that is cut firm, if sufficient time is allowed for formation of the skin on the surface of curd particles after cutting and before stirring. In the present study, the curd for the $CO_2$ treatment was firmer than the control, but also was much lower in bound calcium content.

Why was less fat recovered in the $CO_2$ treatment cheese than in the control cheese? The milk pH of the $CO_2$ treatment (5.9) was closer to the acid pH optimum for chymosin. Higher enzyme activity may lead to excessive casein hydrolysis at coagulation rather than specific action on κ-casein. Nonspecific proteolysis of casein by chymosin would reduce the casein structure's ability to hold fat and higher fat losses would be observed. However, no significant difference in whey crude protein content or crude protein recovery in the cheese was detected between the control and $CO_2$ treatment.

It is more likely that the lower calcium recovery, not casein hydrolysis, in the cheese played a role in the lower fat recovery in the cheese of the $CO_2$ treatment. Increasing the milk serum calcium level by $CO_2$ treatment is similar to adding $CaCl_2$, in that both produce a more firm milk coagulum. The end result of the two methods may be similar, but their impact on cheese composition differs. Adding $CaCl_2$ to milk (0.01 to 0.02% w/w) would not be expected to decrease the bound calcium. On the other hand, acidifying milk (i.e., adding $CO_2$ to a milk pH of 5.9) would decrease bound calcium and colloidal phosphorus (Law and Leaver, 1998) and increase soluble calcium. Thus, the bound calcium and probably the colloidal phosphorus content of the curd in the present study were lower than if the coagulum would have been formed with added calcium. Also, the bound calcium and phosphorus were probably lower in the $CO_2$ treatment than the control cheese indicated by the higher calcium content in the whey of the $CO_2$ treatment. The lower calcium content may have altered the ability of the curd to retain fat during cooking, Cheddaring, salting, and pressing. Further work can identify the exact point in time and the cause for the higher fat loss in the whey when $CO_2$ is used to decrease the milk pH to 5.9 for the manufacture of full-fat Cheddar cheese and this will aid in development of strategies to reduce fat loss during manufacture of full-fat Cheddar when $CO_2$ is used in cheese making.

Crude Protein and Milk Solids Recovery.

No differences (P≥0.05) were detected in mean crude protein recoveries between the treatments for the whey, salt whey, or cheese (Table 11). Total milk solids recovery did not include added salt only milk solids. Total milk solids recovery of the $CO_2$ treatment was higher in the whey and lower in the cheese. The differences in milk solids recovery were generally consistent with the differences in fat and calcium recovery due to $CO_2$ treatment.

Salt Recovery.

An unexpected result of the current study was the difference (P≤0.05) in salt recovery in the cheese between the control and $CO_2$ treatment (Table 11). About 64% of the added salt was recovered in the cheese of the $CO_2$ treatment compared to only 43% in the control cheese. The large difference (Table 10) in salt content between control and $CO_2$ cheeses occurred even though the curd-salting rate was the same for both treatments. No difference (P>0.05) was detected in cheese moisture (Table 10), but the $CO_2$ treatment caused the salt-in-the-moisture to be one and a half times that of the control. St-Gelais et al. (1997) did not detect a difference in cheese salt content between the control and $CO_2$ treatment. The $CO_2$ treatment of St-Gelais et al. (1997) not only had a higher milk pH at coagulant addition (6.47), but a higher curd pH at salting (5.46). In our study, the coagulant and salt were added at lower pH values for the $CO_2$ treatment than in the work of St-Gelais et al. (1997). It is unclear whether the lower calcium content of the curd at salting was responsible for the high salt uptake of $CO_2$ treatment cheese. A marked improvement of added salt retention in Cheddar cheese, like the results shown in Table 11, would reduce salt wastes from a cheese manufacturing facility.

Cheese Yield and Yield Efficiency

Actual and adjusted cheese yields were significantly lower for the $CO_2$ treatment (Table 12). The Van Slyke theoretical yield formula predicted the same yield for both the control and the $CO_2$ treatment because the milk compositions were the same (Table 12).

TABLE 12

Mean (n = 3) actual, moisture and salt adjusted, Van Slyke and
Barbano theoretical cheese yields and cheese yield efficiencies.

|  | Control | $CO_2$ | LSD | SEM |
|---|---|---|---|---|
| Yield | kg/100 kg |  |  |  |
| Actual | 9.26 | 9.07 | NS | 0.052 |
| Adjusted[1] | 9.29$^a$ | 8.86$^b$ | 0.302 | 0.077 |

TABLE 12-continued

Mean (n = 3) actual, moisture and salt adjusted, Van Slyke and Barbano theoretical cheese yields and cheese yield efficiencies.

|  | Control | $CO_2$ | LSD | SEM |
|---|---|---|---|---|
| Van Slyke | 9.21 | 9.21 | NA[2] | NA |
| Barbano | 9.21 | 9.18 | NA | NA |
| Yield efficiency | percent | | | |
| Van Slyke | 100.9[a] | 96.2[b] | 2.599 | 0.662 |
| Barbano | 100.9[a] | 96.5[b] | 2.760 | 0.703 |

[a,b]Means within a row that do not share a common superscript differ ($P \leq 0.05$).
[1]Moisture adjusted to 37% and salt to 1.5%.
[2]NA = not applicable.

Cheese yields predicted by the Barbano theoretical yield formula for the $CO_2$ treatment cheeses were lower because of the different calcium phosphate retention factor used for the $CO_2$ treatment that allowed for the expected lower retention of calcium phosphate in the cheese. The cheese yield efficiency of the control was 100.9%. The mean fat recovery attained with the control cheese (Table 11) was consistent with the theoretical fat recovery (93%) of the theoretical yield formulae, which indicates that the cheese making methods alone did not create the fat loss observed in the $CO_2$ treatment cheese. Preacidification with $CO_2$ resulted in a 4.7% lower Van Slyke yield efficiency and a 4.4% lower Barbano yield efficiency than the control. The difference in yield efficiency within the $CO_2$ treatment (0.3%) represents the reduction in yield due to mineral loss. The fat loss in the whey caused a greater difference in yield efficiency between the control and treatment than calcium loss.

These results indicate that cheese manufactured from milk acidified to a pH of 5.9 using approximately 1600 ppm of $CO_2$ retained less calcium and fat than the control cheese. This same effect will happen in both Cheddar and Mozzarella cheese manufacture. The higher loss of fat was primarily in the whey at draining. Preacidification with $CO_2$ did not alter the crude protein recovery in the cheese. The $CO_2$ treatment resulted in a higher added salt recovery in the cheese and produced a cheese that contained more salt than needed. Considering the higher added salt retention of the $CO_2$ treatment, the salt application rate can be lowered to achieve a typical cheese salt content. This will decrease salt losses during both Cheddar and Mozzarella cheese manufacture. Cheese yield efficiency of the $CO_2$ treated milk was 4.4% lower than the control due to fat loss. However, the method can readily be adapted to offset such fat loss by adding cream or milk fat to milk (or skim milk) after acidification with carbon dioxide. The use of $CO_2$ led to several beneficial effects including better milk coagulation, reduced rennet use, less need for salt addition and potentially reduced problems with calcium crystal formation. Moreover, the use of $CO_2$ reduced moisture migration in the cheese during cooling and produced large block of cheese with more uniform moisture content.

EXAMPLE 3

Less Water Migration and More Uniform Moisture Content is Observed in Cheese Made from Milk Preacidified with $CO_2$ Experimental Design One 18-kg block of milled-curd Cheddar cheese (35×29×19 cm) was manufactured per treatment (from milk with added $CO_2$ and without added $CO_2$) on three different days.

Pasteurized whole milk was carbonated to approximately 1600 ppm $CO_2$, which resulted in a milk pH at the vat of 5.93 compared to 6.65, at 31° C., for the control. Cheese manufacturing conditions were kept constant for the two treatments with the exception the whey from the milk with added $CO_2$ was drained at pH 5.96 compared to 6.35 for the control. The addition of $CO_2$ decreased the total manufacturing time because of the shorter stir-out time. The usage rates of chymosin and salt were the same for both treatments. Cheeses were pressed overnight (17 h). When the cheeses were removed from the press the temperature in the center of the blocks was about 29° C. A more detailed description of cheese making conditions is described in Example 1.

The $CO_2$ content, titratable acidity (TA), pH, soluble nitrogen and casein degradation of the cheeses were monitored over 6 mo of aging at 6° C. Changes in the water phase (monitored by analysis of expressible serum (ES)) were determined.

Sampling and Sample Preparation

Unsalted Milled Curd (USMC) and Cheese Sampling.

Unsalted milled curd samples were taken after milling at pH 5.3, placed in plastic bags, and immediately prepared for removal of expressible serum (ES). Cheeses were sampled by removing three cross sections of cheese, with approximate dimensions of 1 cm by 28 cm by 19 cm, from the center of the block immediately after the block was removed from the press. The first cross section was vacuum packaged for compositional analysis. The second cross section was used for the expressible serum procedure. The sides of the third section were trimmed to leave a center piece of about 9 cm by 15 cm, which was vacuum-packaged and used for $CO_2$ analysis. After the three slices were removed from the center of the block, the two remaining pieces of the block were placed into a plastic bag and vacuum packaged for further aging. Sampling was done again at approximately 30, 90, and 180 d.

Sample Preparation of USMC and Cheese.

Cheeses and unsalted milled curd were cut into 2-cm pieces, ground (Model 31BL92, Waring, New Hartford, Conn.) into 2 to 3 mm, and packed into 59-mL snap lid vials leaving no head space and either analyzed fresh or they were frozen at −80° C. and held until the time of analysis. Cheese slices for $CO_2$ analysis were not ground, but were cut into approximately 3-mm pieces immediately before analysis.

Expressible Serum Preparation.

Expressible serum from unsalted milled curd and cheese immediately after pressing was collected at 25° C. as described in Guo and Kindstedt (1995), except that the samples were centrifuged at 23,500×g. Expressible serum from several centrifuge bottles for each cheese treatment was combined to obtain a enough sample for chemical analyses. Expressible serum was placed in 59-mL snap-top vials and frozen at −80° C.

Chemical Analyses

Expressible Serum Composition.

Total nitrogen (TN) content of the expressible serum was determined in duplicate using the Kjeldahl method (AOAC, 2000; 33.2.11, 991.20. Crude protein was calculated by multiplying the total nitrogen by 6.38. Calcium content was determined in duplicate by atomic absorption (Metzger et al., 2000).

USMC and Cheese Composition and pH.

The fat content was determined by Babcock method (Marshall, 1992; 15.8.A). Moisture was determined gravimetrically by drying in a forced-air oven at 100° C. for 24 h (AOAC, 2000; 33.2.44, 990.20) using a 2-g cheese test portion. Salt content was determined using the Volhard method (Marshall, 1992; 15.5.B). The Kjeldahl method (1-g test portion) was used to determine total nitrogen (Lynch et al., 2002) and crude protein was calculated (TN×6.38). Fat and salt content were not determined for unsalted milled curd. Cheese pH was determined using a Xerolyt combination electrode (Model HA405; Mettler Toledo, Columbus, Ohio) with an Accumet pH meter (model AR 25, Fisher Scientific, Pittsburgh, Pa.) after tempering to 23° C. Titratable acidity (TA) (AOAC, 2000; 33.7.14, 920.124) of the cheese was determined as described by Lau et al. (1991). All analyses were carried out in duplicate except total nitrogen and fat, which were performed in quadruplicate.

$CO_2$ Content of Milk and Cheese.

A method of standard additions (MOSA) was used to determine the $CO_2$ content of cheese by a modification of the method described by Ma et al. (2001) for determining the $CO_2$ content of milk. The MOSA was selected because the control cheeses contained a small background level of $CO_2$ (thus, no blank matrix was available) and because the technique is especially useful when an analyte (e.g., $CO_2$) is present in low concentrations near the limit of quantification, which was the case for the control cheeses. In the MOSA, the sample is tested initially and with increasing added amounts of the analyte, essentially creating a calibration curve using the sample itself (Miller, 1991; González et al., 1999)

For the initial $CO_2$ determination, cheese was cut into approximate 3-mm cubes and 20±0.1 g was weighed into a small, stainless steel blender assembly (catalog number 14-15-18B, mini-sample container, 37-110 mL capacity, Fisher Scientific, Pittsburgh, Pa.). Then, 20 mL of degassed reverse osmosis purified water and 10 mL of 1 N sulfuric acid were added. The blender was immediately covered with Parafilm M (Pechiney Plastic Packaging, Chicago, Ill.) and tightly secured with a rubber band. The contents of the jar were blended at low speed for 30 s then for 15 s at 1-min intervals for a total of 5 blends over a 5 min period. At 15 s after the last blend, a sticky nickel (catalog number 380-035, MOCON, Minneapolis, Minn.) was placed on the Parafilm M cover. The $CO_2$ content in the headspace was determined by sampling with a gas-sampling needle inserted through the sticky nickel, taking care to keep the needle out of cheese slurry. The sampling needle was connected to an infrared $CO_2$ analyzer (Pac Check 650, MOCON, Minneapolis, Minn.) previously calibrated with room air ("0" $CO_2$) and 99.8% $CO_2$ (catalog number 23402, manufactured for Supelco, Bellefonte, Pa., by Scott Specialty Gases). A reading of the $CO_2$ content (percent $CO_2$) of the headspace was then taken. After the initial reading was obtained, the same procedure was repeated 5 times using a new 20 g portion of the same cheese sample each time. $CO_2$ levels were increased in 30 to 50% increments over the previous reading. $CO_2$ was added to the sample by decreasing the amount of degassed water initially added and substituting a corresponding volume of sodium bicarbonate standard solution (0.5 g/100 g, equivalent to ca 2.6 mg $CO_2$/g or 2600 ppm $CO_2$) so that the final amount of added standard solution and degassed water totaled 20 mL.

A MOSA linear regression equation (y=mx+b) was constructed from the initial and 5 determinations with added sodium bicarbonate standard solution, where y=instrument reading (% $CO_2$), m=slope, x=sodium bicarbonate added (expressed as ppm $CO_2$ in cheese) and b=intercept. The concentration of $CO_2$ in an individual cheese was calculated by extrapolation of the regression equation to y=0 and using the absolute value of x at y=0. Visual inspection of the experimental data and the resulting coefficients of determination ($R^2 \geq 0.99$) indicated the resulting regression equations were linear.

Proteolysis

Cheese pH 4.6 and 12% TCA soluble nitrogen as a percentage of total nitrogen (SNPTN) were determined in duplicate as described by Bynum and Barbano (1985). SDS-PAGE was performed as described by Neocleous et al. (2002) except a 7 µL sample (1 g of cheese per 10 mL of sample buffer) was loaded per lane for all cheese samples and a constant 15% concentration acrylamide gel was used. Results of the SDS-PAGE analysis were reported as the ratio of $\alpha_s$%-casein and β-casein to para-κ-casein. This was done to normalize the data for small variations in sample loading that can result from sample preparation since para-κ-casein is not hydrolyzed during aging (Nath and Ledford, 1973). The ratios of $\alpha_s$-casein and β-casein to para-κ-casein were used by Lau et al. (1991) and Neocleous et al. (2002) in the casein degradation calculations that were reported by those investigators. However, Lau et al. (1991) and Neocleous et al. (2002) used those ratios to calculate the percentage of casein degraded in the cheeses by using the first day of analysis as 0% of casein degraded. In those studies there was no difference between treatments at time zero. As a result, the data from the first day of analysis was not reported. In the experiments reported herein, the first day of analysis was very important because of the differences between treatments immediately after the cheeses were removed from the press. During aging $\alpha_s$-casein and β-casein were hydrolyzed and their bands on the SDS-PAGE gel became less intense, while para-κ-casein remained constant. A decreasing ratio indicates proteolysis of either $\alpha_s$-casein or β-casein.

Expressible serum from cheese and unsalted milled curds were prepared using 0.9 mL of the sample buffer containing dithiothreitol as described by Verdi et al. (1987) and 0.1 mL of expressible serum. SDS was purchased from Sigma-Aldrich Chemical (L-4390; St. Louis, Mo.). A 10 to 20% SDS-PAGE gradient gel (Verdi et al., 1987) was used for expressible serum electrophoresis. Unsalted milled curd expressible serum gels were loaded with 16 µL of sample plus buffer per lane for both the control and $CO_2$ treatment. Cheese expressible serum loadings of sample plus buffer for the control and $CO_2$ treatment were 8 µL and 4 µL, respectively because the expressible serum from the $CO_2$ treatment contained more protein than the control expressible.

The presence of $\alpha_{s1}$-I-casein in the expressible serum of the $CO_2$ treatment cheeses was determined by an additional experiment where an $\alpha_s$-casein solution and a milk were separately incubated with chymosin. Samples were then analyzed with our SDS-PAGE procedure. After 1 hour of incubation a large protein band was present below the $\alpha_{s1}$-casein in the $\alpha_s$-casein solution treated with chymosin. After two hours that band was more pronounced. A band in the same location was present in the milk sample after incubation with chymosin. The band appeared below the β-casein. Since $\alpha_{s1}$-I-casein was found by Creamer and Richardson (1974) to be the primary proteolytic product of chymosin action on $\alpha_{s1}$-casein, this unknown band in the expressible serum of the $CO_2$ treatment was likely $\alpha_{s1}$-I-casein. The presence of the $\alpha_{s1}$-I-casein band after the β-casein band in the gels run as described herein differed from those in report of Malin et al. (1995). Protein migration patterns can be different due to different sources of SDS (Swaney et al., 1974). Although Malin et al. (1995) did not report their source of SDS, different sources of SDS were the likely cause of the $\alpha_{s1}$-I-casein migration differences.

Statistical Analysis

The PROC GLM procedure of SAS was used for all data analysis (SAS version 8.02, 1999-2001, SAS Institute Inc., Cary, N.C.). The least significant difference test ($P \leq 0.05$) was used to compare treatment means of the compositional data if the F-test for the statistical model was significant ($P \leq 0.05$). One-way ANOVA was used to analyze cheese and USMC composition data. For comparison of the control and $CO_2$ treatment at any one sampling period (i.e. 0, 30, 90, and 180 d) a t-test was performed. ANOVA was used to analyze data over the aging period and least-square means are reported in the text for $CO_2$ content, titratable acidity, pH, SNPTN, $\alpha_s$-casein:para-κ-casein, and β-casein:para-κ-casein of the control and $CO_2$ treatment cheeses over the 6 mo of aging. Age was analyzed as a continuous variable. A mathematical transformation of the age variable was necessary to minimize multicollinearity of the linear and quadratic forms of the age variable (Glantz and Slinker, 2001). The transformation of age, age=day of storage at 6° C.—((last testing day—first testing day)/2), made the data set orthogonal with respect to age. The quadratic term for age and the interaction of age by treatment were included in the statistical model if significant, or if not significant to show that the curvature was not detected, in the case of $CO_2$ content during aging (FIG. 4).

Results

Figure 4:
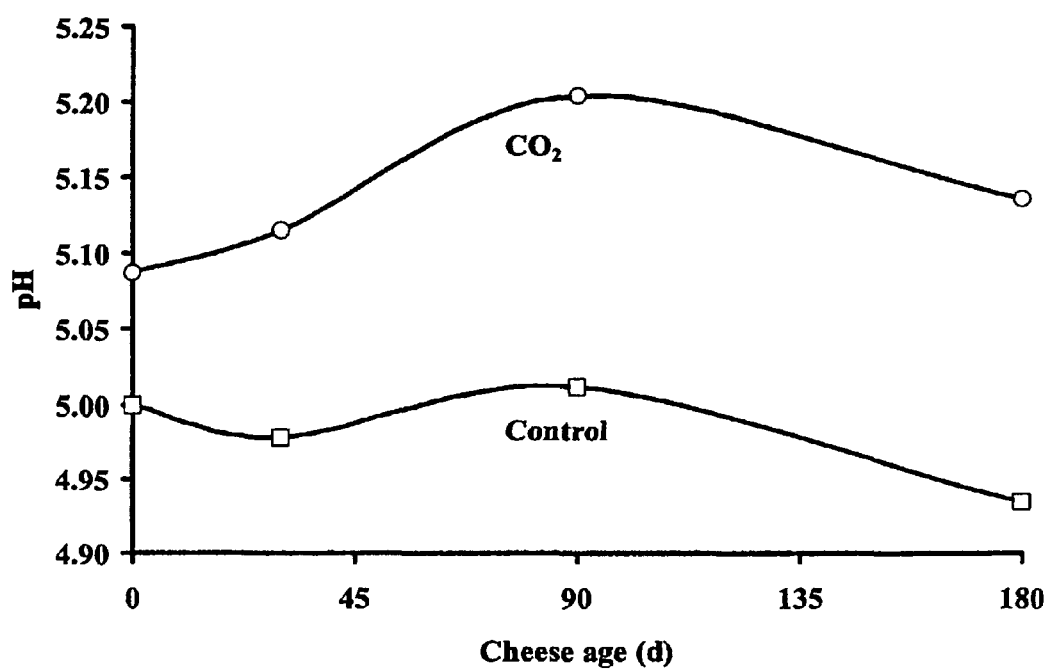
FIG. 4 graphically illustrates the mean (n=3) pH of the control and $CO_2$-treated Cheddar cheeses during 6 months of aging.

USMC and Cheese Composition ppm) and did not change during aging (Table 14, FIG. 4). The least squares mean pH of the control, 4.98, was lower ($P \leq 0.01$) than the treatment, 5.14. A linear age by treatment interaction was detected as well as a quadratic function of age ($P \leq 0.01$, Table 9, FIG. 5).

TABLE 14

Type III SS for cheese $CO_2$, pH, titratable acidity (TA), soluble nitrogen as a percentage of total nitrogen (SNPTN), and ratios of $\alpha_s$-casein and $\beta$-casein to para-$\kappa$-casein at 0, 30, 90, 180 d of aging.

| Factor | df | $CO_2$ | pH | TA | pH 4.6 SNPTN | 12% TCA SNPTN | $\alpha_s$-CN:para-$\kappa$-CN | $\beta$-CN:para-$\kappa$-CN |
|---|---|---|---|---|---|---|---|---|
| Treatment[1] (T) | 1 | 273494** | 0.15** | 0.14** | 30** | 2** | 2** | 0.1 |
| Age (A) | 1 | 3668 | <0.01 | 0.61** | 914** | 236** | 16** | 3.3** |
| A × A | 1 | 3686 | 0.02** | ... | 59** | 10** | 5** | ... |
| A × T | 1 | ... | 0.01** | 0.03* | ... | ... | 1* | ... |
| Error | 19 | ... | 0.02 | ... | ... | ... | 3 | ... |
| Error | 20 | 27160 | ... | 0.13 | 8 | 3 | ... | ... |
| Error | 21 | ... | ... | ... | ... | ... | ... | 1.9 |
| $R^2$ | | 0.91 | 0.89 | 0.85 | 0.99 | 0.99 | 0.88 | 0.64 |

*$P \leq 0.05$.
**$P \leq 0.01$.
[1]Treatments are cheeses manufactured from milk with and without added $CO_2$.

No difference (P>0.05) was detected between the control and $CO_2$ treatment for unsalted milled curd moisture and crude protein (Table 13). As expected, the calcium content of the USMC was lower for the $CO_2$ treatment (Table 13) because of the lower pH at draining (5.96 vs. 6.35). No difference in CP, PDB, moisture, and MNFS was detected between the control and $CO_2$ treatment cheeses (Table 13). The fat content and fat on a dry basis were higher ($P \leq 0.05$) for the control cheese. The lower ($P \leq 0.05$) calcium content in the $CO_2$ treatment cheese was expected, but the higher ($P \leq 0.05$) salt content (Table 13) of the $CO_2$ treatment cheese was not expected.

TABLE 13

Mean (n = 3) unsalted milled curd (USMC) and Cheddar cheese composition.

| Component | Control percent | $CO_2$ percent | LSD | SEM |
|---|---|---|---|---|
| USMC | | | | |
| Moisture | 46.58 | 46.35 | NS | 0.834 |
| Crude Protein | 20.29 | 20.92 | NS | 0.273 |
| Calcium | 0.63[a] | 0.46[b] | 0.063 | 0.016 |
| Calcium/Crude Protein (×100) | 3.09[a] | 2.20[b] | 0.344 | 0.088 |
| Cheddar cheese | | | | |
| Fat | 34.19[a] | 32.83[b] | 1.024 | 0.261 |
| FDB[1] | 54.12[a] | 52.67[b] | 0.859 | 0.219 |
| Crude Protein | 23.72 | 24.02 | NS | 0.213 |
| PDB[2] | 37.49 | 38.09 | NS | 0.423 |
| Moisture | 36.84 | 37.67 | NS | 0.285 |
| MNFS[3] | 55.97 | 56.08 | NS | 0.246 |
| Salt | 1.44[b] | 2.24[a] | 0.119 | 0.030 |
| Salt-in-moisture | 3.92[b] | 5.96[a] | 0.385 | 0.098 |
| Calcium | 0.69[a] | 0.52[b] | 0.035 | 0.009 |
| Calcium/Crude Protein (×100) | 2.91[a] | 2.15[b] | 0.185 | 0.047 |

[a,b]Means within a row without a common superscript differ ($P \leq 0.05$).
[1]FDB = fat on a dry basis.
[2]PDB = protein on a dry basis.
[3]MNFS = moisture in the nonfat substance.

Figure 5:
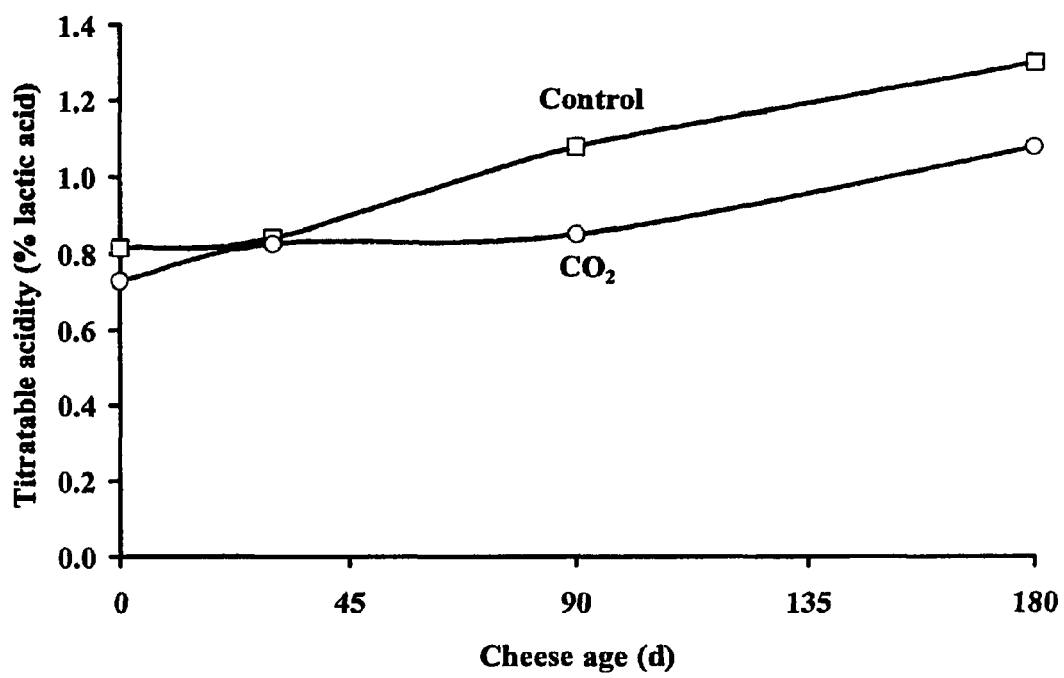
FIG. 5 graphically illustrates the mean (n=3) titratable acidity of the control and $CO_2$-treated Cheddar cheeses during 6 months of aging.

The least squares mean $CO_2$ content of the treatment cheese (337 ppm) was higher ($P \leq 0.01$) than the control (124 ppm) and did not change during aging (Table 14, FIG. 4). The least squares mean titratable acidity of the control cheese, 1.01%, was higher than ($P \leq 0.01$) than the $CO_2$ treatment cheese, 0.87%, and was consistent with the difference in pH (FIGS. 4 and 5). The titratable acidity, increased as a linear function of cheese age (Table 9, FIG. 5) and there was an age by treatment interaction with the titratable acidity of the control cheese increasing faster with age than the $CO_2$ treatment cheese (FIG. 5).

Proteolysis

Figure 6:
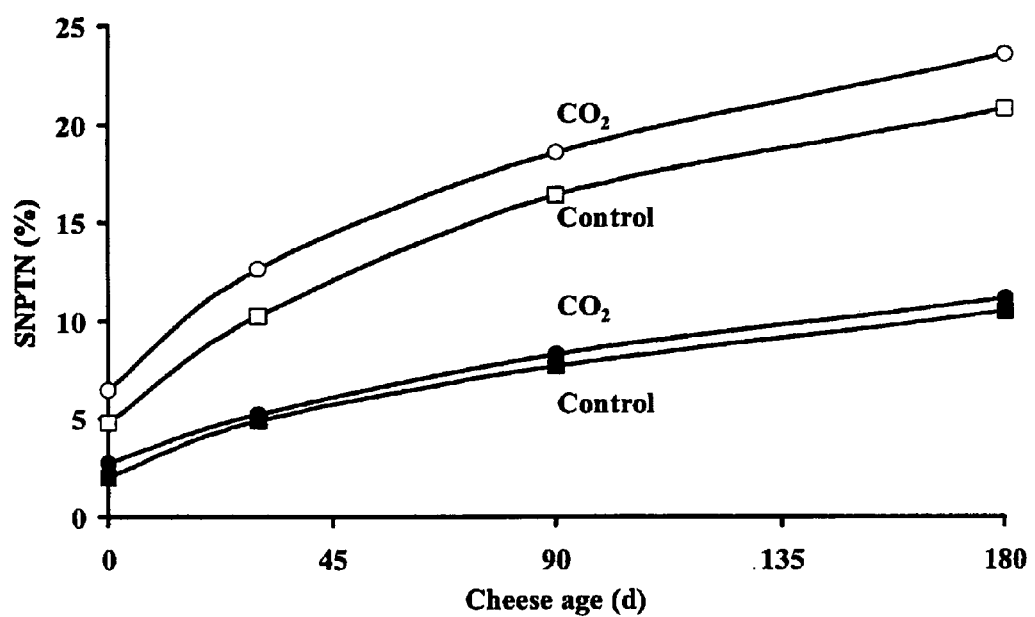
FIG. 6 graphically illustrates the mean (n=3) soluble nitrogen as a percentage of total nitrogen (SNPTN) of the control and $CO_2$-treated cheeses during 6 months of aging. Open symbols indicate pH 4.6 SNPTN and closed symbols indicate 12% TCA SNPTN.

The $CO_2$ treatment had higher (Table 14, $P \leq 0.05$) mean levels of pH 4.6 and 12% TCA soluble nitrogen as a percentage of total nitrogen (SNPTN) than the control immediately after pressing, 6.44% versus 4.79% and 2.71% versus 2.03%, respectively (FIG. 6). During aging, the $CO_2$ treatment had a higher ($P \leq 0.01$) least squares mean content of pH 4.6 SNPTN, 15.31%, than the control, 13.08%. The $CO_2$ treatment also contained more ($P \leq 0.01$) 12% TCA SNPTN, 6.85%, than the control, 6.28%, during aging. The pH 4.6 and 12% TCA SNPTN increased in both the control and $CO_2$ treatment over the 6 mo aging period (FIG. 6) both as a linear and a quadratic function of age (Table 14, $P \leq 0.01$). The level of pH 4.6 and TCA SNPTN were similar to levels reported previously for Cheddar cheese (Lau et al., 1991; Neocleous et al., 2002.)

Figure 7:
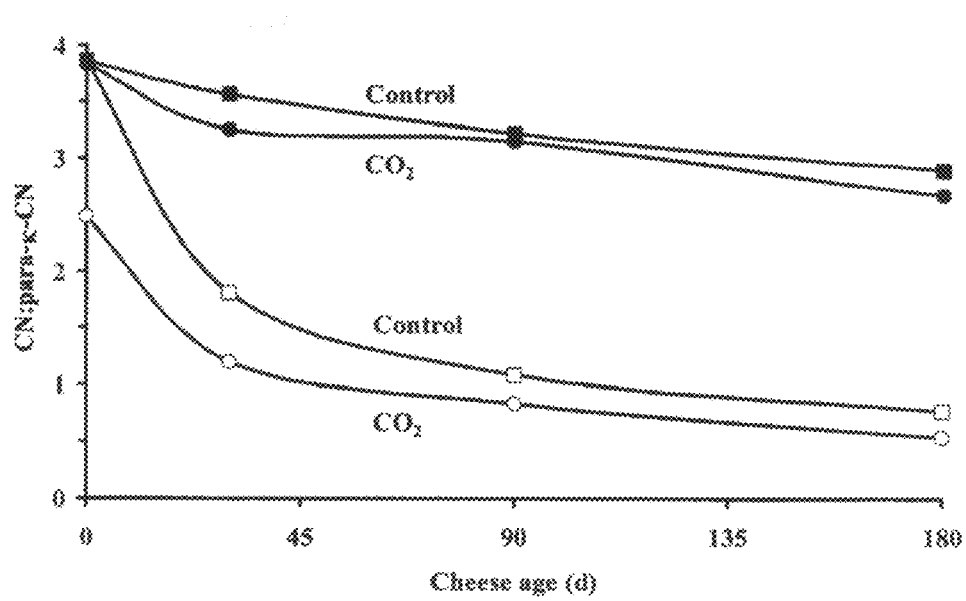
FIG. 7 graphically illustrates the mean (n=3) ratios of $\alpha_s$-casein to para-κ-casein (open symbols) and β-casein to para-κ-casein (closed symbols) in cheeses during 6 months of aging. Square symbols are used for control cheeses and circular symbols are used for $CO_2$-treated cheeses.

No difference (P>0.05) in $\alpha_s$-casein:para-$\kappa$-casein and $\beta$-casein:para-$\kappa$-casein ratios were detected between the unsalted milled curds of the control and $CO_2$ treatment, data not shown. The difference in the $\alpha_s$-casein:para-$\kappa$-casein ratio between control and $CO_2$ treatment cheeses was more pronounced at 0 d when the cheeses were removed from the press (FIG. 7) than at any other time. When the cheeses were removed from the press the $CO_2$ treatment had a lower ($P \leq 0.05$) $\alpha_s$-casein:para-K-casein ratio than the control 2.48 and 3.87, respectively. The least squares mean $\alpha_s$-casein:para-$\kappa$-casein ratio of the $CO_2$ treatment cheese, 1.26, was lower ($P \leq 0.01$) than the control cheese, 1.88, during 6 mo of aging (FIG. 7). The $\alpha_s$-casein:para-$\kappa$-casein ratio changed both as a linear and quadratic function of age and there was a linear age by treatment interaction (Table 14). No significant difference (P>0.05) in $\beta$-casein:para-$\kappa$-casein ratio was detected between the control and $CO_2$ treatment immediately out of the press or during aging (FIG. 7, Table 14). The linear function of age was significant (Table 14), because the β-casein:para-κ-casein ratio decreased in both the control and $CO_2$ treatment cheeses during the aging period.

USMC and Cheese Expressible Serum

Figure 8:
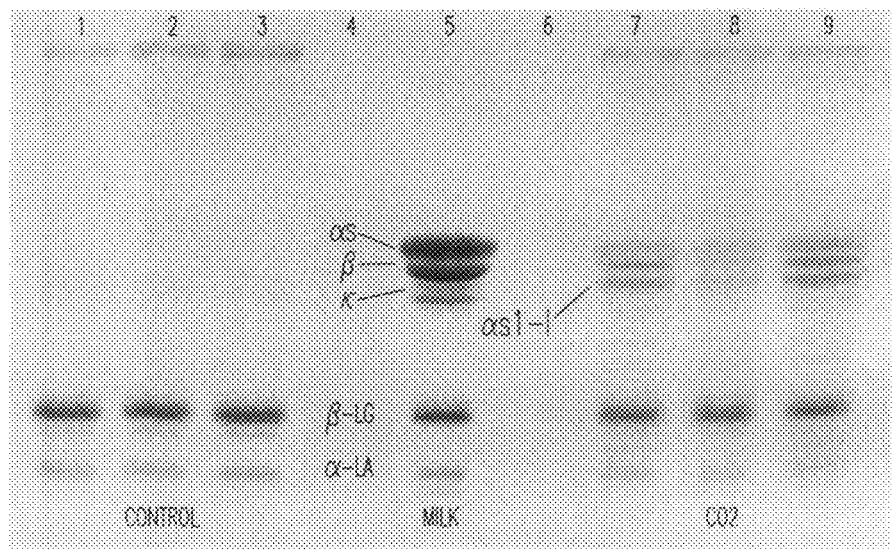
FIG. 8 shows the proteins in expressible serum (ES) (25° C.) of Cheddar cheese, immediately after overnight pressing (about 16 h), separated by SDS-PAGE. Lanes 1 to 3 contain expressible serum of control cheeses from three cheese makings. Lane 5 is a whole milk reference sample. Lanes 7 to 9 contain expressible serum from $CO_2$-treated cheese from three cheese makings. Protein bands are identified on the gel.

No difference (P>0.05) in the amount of unsalted milled curd expressible serum was detected between the control and $CO_2$ treatment (Table 8). There was a large decrease in the amount of expressible serum for both the control and $CO_2$ treatment due to salting and pressing. After salting and pressing, almost twice the amount of expressible serum could be removed from the control cheese compared to the $CO_2$ treatment (Table 8). Expressible serum from the $CO_2$ treated unsalted milled curds had a slightly higher (P≤0.05) CP content than the control. After salting and pressing the crude protein content of the expressible serum from the $CO_2$ treatment cheese was much higher than the control (Table 15). The calcium content of the unsalted milled curd and cheese expressible serum from the $CO_2$ treatment was lower than the control. Because the crude protein was higher and calcium was lower in the expressible serum of the $CO_2$ treatment, the calcium expressed as a percentage of crude protein was much lower (P≤0.05) than the control for both the unsalted milled curd and cheese. Neither the $CO_2$ treatment nor the control unsalted milled curd expressible serum contained a detectable amount of casein on an SDS-PAGE gel (data not shown). Casein was found in the $CO_2$ treatment cheese expressible serum but not in the control cheese expressible serum (FIG. 8).

As shown in this Example, using milk preacidified with $CO_2$ led to decreased water migration and a more uniform cheese moisture content. Moreover, less rennet and salt is needed when milk is preacidified before cheese making. The $CO_2$ content of Cheddar cheese manufactured using milk preacidified with $CO_2$ was consistently higher during aging than the control cheese. However, such increased $CO_2$ content was not detrimental and actually provided certain benefits. Increased $CO_2$ content can inhibit microbial growth, thereby increasing cheese shelf life. Hence, using preacidified milk for cheese making provides several benefits.

EXAMPLE 4

Mozzarella Cheese Made by the Present Methods has Excellent Melting Properties The Example illustrates that mozzarella cheese, made as described herein without cooking, stretching, brining, shredding and aging has excellent melting properties and can readily be used on fresh and frozen food products, including fresh or frozen pizza.

Mozzarella cheese was made from carbon dioxide acidified milk in a cheese-making vat as described herein. No cooking, stretching, brining and aging steps were employed in the cheese-making process. After cheese-making, the cheese curd particles were individually quick-frozen. After thawing, the cheese particles did not exude noticeable amounts of liquid before, during or after baking on a pizza.

The composition of the cheese was:
Moisture=53.02%
Fat=20.5%
Fat on dry basis (FDB)=43.6%
Salt=1.96
Protein=20.4%
pH=5.35

Figure 9A:
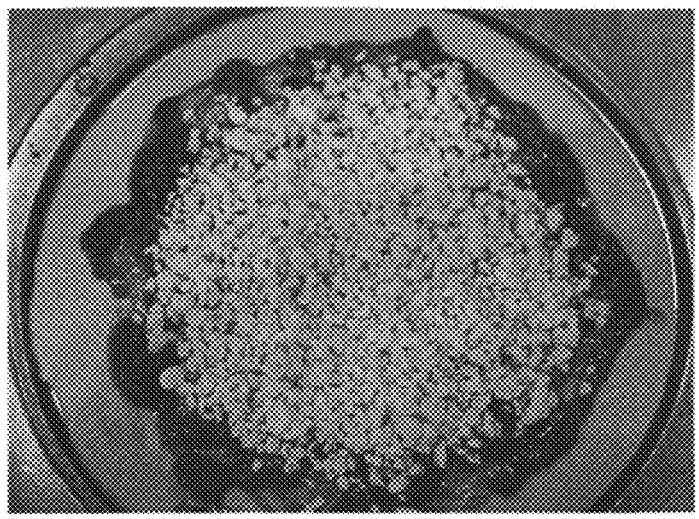
FIG. 9A shows mozzarella cheese of the invention on a pizza before baking. The mozzarella cheese was made in a vat as described herein without cooking, stretching and aging. After cheese-making, the cheese curd particles were individually quick-frozen, then thawed and placed on the pizza. Thus, the cheese shown is essentially curd particles obtained from the cheese-making vat. Note that the cheese did not exude liquid after thawing.
Figure 9B:
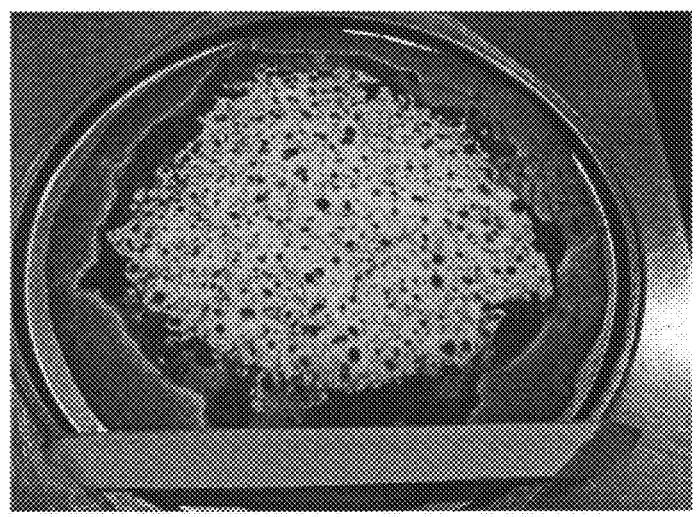
FIG. 9B shows the pizza of FIG. 9A after baking. As illustrated, the cheese has excellent melting properties and did not exude liquid after baking.
Figure 9C:
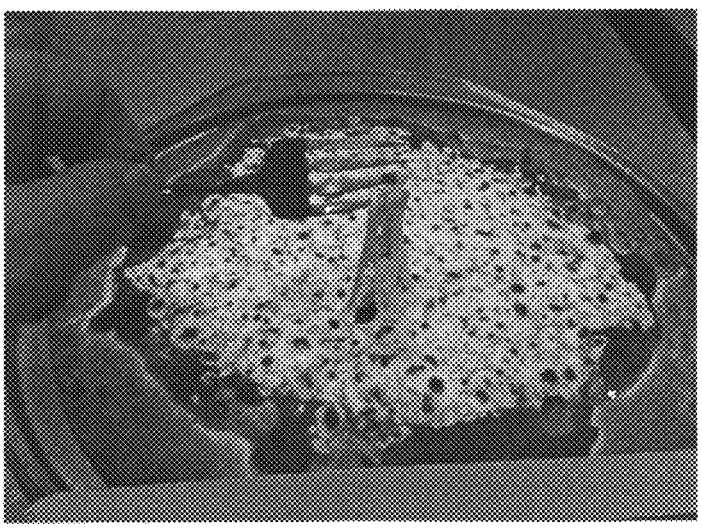
FIG. 9C shows a fork lifting cheese from the baked pizza of FIG. 9B to illustrate the "stretch" of the mozzarella cheese melted onto the pizza.

Mozzarella cheese particles from this batch were placed on a pizza as shown in FIG. 9A. The pizza shown in FIG. 9A was then baked at 500° F. for 4.5 minutes. This baked pizza is shown in FIG. 9B. As shown, the cheese melted smoothly to cover the surface of the pizza (FIG. 9B). No excess moisture or excessive fat separation were visible. The cheese was then stretched with a fork to illustrate its cohesiveness as shown in FIG. 9C.

Thus the mozzarella cheese of the invention has excellent melting properties, exhibiting the "stretchiness" expected for mozzarella cheese after melting.

EXAMPLE 5

Modulating the Moisture Content of Mozzarella Cheese Made by the Present Methods The Example illustrates that the moisture content can readily be modulated when making mozzarella cheese as described herein that require no cooking, stretching, brining, shredding and aging steps.

Two batches of mozzarella cheese were made from carbon dioxide acidified milk in a cheese-making vat as described herein. No cooking, stretching, brining and aging steps were employed in the cheese-making process. The only difference between the two vats was the temperature of curd at the time of salt application. The curd temperature in vat 1 was lower (about 70° F.) than the curd for Vat 2 (about 80° F.). The two cheeses had the following properties (all values shown are a weight percentage).

TABLE 15

|  | Vat 1 (70° F.) | Vat 2 (80° F.) |
| --- | --- | --- |
| Moisture | 56.97 | 55.40 |
| Fat | 17.75 | 19.25 |
| Salt | 1.97 | 1.74 |
| Protein | 18.93 | 20.48 |
| pH | 5.37 | 5.33 |
| FDB | 41.25 | 43.16 |

Thus the curd cooled to 70° F. before salting had a higher moisture and salt content.

REFERENCES

Association of Official Analytical Chemists, International ["AOAC"] 2000. Official Methods of Analysis. $17^{th}$ ed. AOAC, Gaithersburg, Md.

Aston, J. W. and L. K. Creamer. 1986. Contribution of the components of the water-soluble fraction to the flavour of Cheddar cheese. N. Z. J. Dairy Sci. and Technol. 21:229-248.

Barbano, D. M. 1996. Mozzarella cheese yield: factors to consider. Pages 29 to 38 in Proc. Wisconsin Cheese Makers Mtg., Ctr for Dairy Res., Univ. Wisconsin Madison.

Barbano, D. M., and J. W. Sherbon. 1984. Cheddar cheese yields in New York. J. Dairy Sci. 67:1873-1883.

Bynum, D. G., and D. M. Barbano. 1985. Whole milk reverse osmosis retentates for Cheddar cheese manufacture: chemical changes during aging. J. Dairy Sci. 68:1-10.

Calvo, M. M., M. A. Montilla, and Agustin Olano. 1993. Rennet—clotting properties and starter activity on milk acidified with carbon dioxide. J. Food Prot. 56:1073-1076.

Champagne, C. P., D. St-Gelais, and A. de Candolle. 1998. Acidification rates and population ratios of lactic starters in carbonated milk. Lebensm.—Wiss. u. Technol. 31:100-106.

Creamer, L. K., R. C. Lawrence, and J. Gilles. 1985. Effect of acidification of cheeses milk on the resultant Cheddar cheese. N. Z. J. Dairy Sci Technol. 20:185-203.

Creamer, L. K., and N. F. Olsen. 1982. Rheological evaluation of maturing Cheddar cheese. J. Food Sci. 47:631-635, 646.

Creamer, L. K., and B. C. Richardson. 1974. Identification of the primary degradation product of $\alpha_{s1}$-casein in Cheddar cheese. N. Z. J. Dairy Sci. Technol. 9:9-13.

Dalgleish, D. G., and A. J. R. Law. 1988. pH-Induced dissociation of bovine casein micelles. I. Analysis of liberated casein. J. Dairy Res. 55:529-538.

Dalgleish, D. G., and A. J. R. Law. 1989. pH-Induced dissociation of bovine casein micelles. II. Mineral solubilization and its relation to casein release. J. Dairy Res. 56:727-735.

de Roos, A. L., R. J. Geurts, and P. Walstra. 2000. The association of chymosin with artificial casein micelles. Inter. Dairy J. 10:225-232.

Fox, P. F. 1970. Influence of aggregation on the susceptibility of casein to proteolysis. J. Dairy Res. 37:173-180.

Glantz, S. A., and B. K. Slinker. 2001. Multicollinearity and what to do about it. Pages 185-187 in Primer of Applied Regression and Analysis of Variance. $2^{nd}$ ed. McGraw-Hill, Inc., New York, N.Y.

González, A. G., M. A. Herrador, and A. G. Asuero. 1999. Intra-laboratory testing of method accuracy from recovery assays. Talanta. 48:729-736.

Grappin, R., T. C. Rank, N. F. Olson. 1985. Primary proteolysis of cheese during ripening—a review. J. Dairy Sci. 68:531-540.

Guo, M. R., J. A. Gilmore, and P. S. Kindstedt. 1997. Effect of sodium chloride on the serum phase of mozzarella cheese. J. Dairy Sci. 80:3092-3098.

Guo, M. R., and P. S. Kindstedt. 1995. Age-related changes in the water phase of mozzarella cheese. J. Dairy Sci. 78:2099-2107.

Holmes, D. G., J. W. Duersch, and C. A. Ernstrom. 1977. Distribution of milk clotting enzymes between curd and whey and their survival during Cheddar cheese making. J. Dairy Sci. 60:862-869.

Hotchkiss, J. H. and E. Lee. 1996. Extending shelf-life of dairy products with dissolved carbon dioxide. Eur. Dairy Mag. 8(3):16, 18-19.

Johnson, M. E., C. M. Chen, and J. J. Jaeggi. 2001. Effect of rennet coagulation time on composition, yield, and quality of reduced-fat Cheddar cheese. J. Dairy Sci. 84:1027-1033.

King, J. S., and L. A. Mabbitt. 1982. Preservation of raw milk by the addition of carbon dioxide. J. Dairy Res. 49:439-447.

King, J. S., and L. A. Mabbitt. 1987. The use of carbon dioxide for the preservation of milk. The use of carbon dioxide for the preservation of milk. Pages 35-43 in Preservatives in the Food, Pharmaceutical, and Environmental Industries. Technical Series, Society for Applied Bacteriology. No. 22. Blackwell Scientific Publications, Boston, Mass.

Lau, K. Y., D. M. Barbano, and R. R. Rasumssen. 1991. Influence of pasteurization of milk on protein breakdown in Cheddar cheese during aging. J. Dairy Sci. 74:727-740.

Law, A. J. R., and J. Leaver. 1998. Effects of acidification and storage of milk on dissociation of bovine casein micelles. J. Agric. Food Chem. 46:5008-5016.

Lynch, J. M., D. M. Barbano, and J. R. Fleming. 2002. Determination of the total nitrogen content of hard, semihard and processed cheese by the Kjeldahl method: collaborative study. J. AOAC. 85:445-455.

Ma, Y., and D. M. Barbano. 2003a. Effect of temperature of $CO_2$ injection on the pH and freezing point of milks and creams. J. Dairy Sci. 86:1578-1589.

Ma, Y., and D. M. Barbano, and M. Santos. 2003b. Effect of $CO_2$ addition to raw milk proteolysis and lipolysis at 4 C. J. Dairy Sci. 86:1616-1631.

Ma, Y., D. M. Barbano, J. H. Hotchkiss, S. Murphy, and J. M. Lynch. 2001. Impact of $CO_2$ addition to milk on selected analytical testing methods. J. Dairy Sci. 84:1959-1968.

Malin, E. L., M. H. Tunick, P. W. Smith, and V. H. Holsinger. 1995. Inhibition of proteolysis in mozzarella cheese prepared from homogenized milk. Pages 237-246 in Chemistry of Structure-Function Relationships in Cheese. E. L. Malin and M. H. Tunick, ed. Plenum Press, New York, N.Y.

Marshall, R. T., ed. 1992. Standard Methods for the Examination of Dairy Products. $16^{th}$ ed. Am. Publ. Health Assoc., Inc., Washington, D.C.

McCarney, T., W. M. A. Mullan, and M. T. Rowe. 1995. Effect of carbonation of milk on Cheddar cheese yield and quality. Milchwissenschaft 50:670-674.

Metzger, L. E., D. M. Barbano, M. A. Rudan, and P. S. Kindstedt. 2000. Effect of preacidification on low fat Mozzarella cheese. I. Composition and Yield. J. Dairy Sci. 83:648-658.

Metzger, L. E., D. M. Barbano, P. S. Kindstedt, and M. R. Guo. 2001. Effect of milk preacidification on low fat Mozzarella cheese. II. Chemical and functional properties during storage. J. Dairy Sci. 83:1348-1356.

Mickelsen, R., and C. A. Ernstrom. 1967. Factors affecting stability of rennin. J. Dairy Sci. 50:645-650.

Miller, J. N. 1991. Basic statistical methods for analytical chemistry. Part 2. Calibration and regression methods. A review. Analyst. 116:3-14.

Montilla, A., M. M. Calvo, and A. Olano. 1995. Manufacture of cheese made from $CO_2$ treated milk. Z. Lebensm. Unters. Forsch. 200:289-292.

Mulvihill, D. M., and P. F. Fox. 1977. Proteolysis of $\alpha_{s1}$-casein by chymosin: influence of pH and urea. J. Dairy Res. 553-540.

Mistry, V. V., and K. M. Kasperson. 1998. Influence of salt on the quality of reduced fat Cheddar cheese. J. Dairy Sci. 81:1214-1221.

Nath, K. R., and R. A. Ledford. 1973. Growth response of *Lactobacillus casei* variety casei to proteolysis in cheese during ripening. J. Dairy Sci. 56:710-715.

Nelson, B. K., J. M. Lynch, and D. M. Barbano (2004) Impact of preacidification with $CO_2$ on Cheddar cheese composition and yield. J. Dairy Sci. 87:3581-3589.

Neocleous, M., D. M. Barbano, and M. A. Rudan. 2002. Impact of low concentration factor microfiltration on milk component recovery and Cheddar cheese yield. J. Dairy Sci. 85:2415-2424.

Neocleous, M., D. M. Barbano, and M. A. Rudan. 2002. Impact of low concentration factor microfiltration on the composition and aging of Cheddar cheese. J. Dairy Sci. 85:2425-2437.

Olabi A., and D. M. Barbano. 2002. Temperature induced moisture migration in reduced fat Cheddar cheese. J. Dairy Sci. 86:1083-1100.

Ramachandra Rao, H. G., M. J. Lewis, and A. S. Grandison. 1994. Effect of soluble calcium of milk on fouling of ultrafiltration membranes. J. Sci. Food Agic. 65:249-256.

Ramkumar, C., L. K. Creamer, K. A. Johnston, and R. J. Bennett. 1997. Effect of pH and time on the quantity of readily available water within fresh cheese curd. J. Dairy Res. 64:123-134.

Rashed, M. A., N. M. Mehanna, and A. S. Mehanna. 1986. Effect of carbon dioxide on improving the keeping quality of raw milk. J. Soc. Dairy Technol. 39:62-64.

Ruas-Madiedo, P., J. C. Bada-Gancedo, T. Delgado, M. Gueimonde, and C. G. de los Reyes-Gavilán. 2003. Proteolysis in rennet-coagulated Spanish hard cheeses made form milk preserved by refrigeration and addition of carbon dioxide. J. Dairy Res. 70:115-122.

Rudan, M. A. and D. M. Babano. 1998. A model of Mozzarella cheese melting and browning during pizza baking. J. Dairy Sci. 81:2312-2319.

St-Gelais, D., C. P. Champagne, and G. Bélanger. 1997. Production of Cheddar cheese using milk acidified with carbon dioxide. Milchwissenschaft. 52:614-618.

Swaney, J. B., G. F. V. Woude, and H. L. Bachrach. 1974. Sodium dodecylsulfate-dependent anomalies in gel electrophoresis: Alterations in the banding patterns of foot-and-mouth disease virus polypeptides. Anal. Biochem. 58:337-346.

Tong, P. S., D. M. Barbano, and W. K. Jordan. 1989. Characterization of proteinaceous membrane foulants from whey ultrafiltration. J. Dairy Sci. 72:1435-1442.

Van Slyke, L. L., H. A. Harding, and E. B. Hart. 1903. Rennet-enzyme as a factor in cheese-ripening. New York State Agric. Exp. Stn. Bulletin no. 233. Cornell University. Ithaca, N.Y.

Verdi, R. J., D. M. Barbano, and M. E. Dellavalle. 1987. Variability in true protein, CN, nonprotein nitrogen and proteolysis in high and low somatic cell count milks. J. Dairy Sci. 70:230-242.

U.S. Department of Agriculture, Agricultural Research Service. 2003. USDA National Nutrient Database fro Standard Reference, Release 16. Nutrient Data Laboratory Home Page, http://www.nal.usda.gov/fnic/foodcomp.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "an antibody" includes a plurality (for example, a solution of antibodies or a series of antibody preparations) of such antibodies, and so forth. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed:

1. A method for making a mozzarella cheese that comprises: acidifying pasteurized milk with carbon dioxide to a pH of about 5.80 to about 6.2 at a temperature of about 32° F. to about 95° F. to produce an acidified milk before adding cheese making starter cultures and making a mozzarella cheese with a moisture content of about 50% to about 60% therefrom.

2. The method of claim 1, wherein the pasteurized milk is skim milk or reduced fat milk.

3. The method of claim 2, wherein cream, milk protein, milk fat or a fractionated milk product is added to the skim milk after acidification.

4. The method of claim 1, wherein the pasteurized milk is whole milk or a standardized milk product.

5. The method of claim 4, wherein the standardized milk product has a selected fat or protein content.

6. The method of claim 1, wherein the pasteurized milk is acidified with about 500 ppm to about 2500 ppm carbon dioxide.

7. The method of claim 1, wherein the method further comprises adding a starter culture of lactic acid producing bacteria after acidifying the pasteurized milk.

8. The method of claim 7, wherein the lactic acid producing bacteria are *Streptococcus thermophilus* and *Lactococcus cremoris* bacteria.

9. The method of claim 1, wherein the method further comprises coagulating the pasteurized milk with a coagulating agent.

10. The method of claim 9, wherein the coagulating agent is rennet.

11. The method of claim 10, wherein less rennet is used than would be used in a cheese making process that does not employ acidifying the pasteurized milk.

12. The method of claim 11, wherein the rennet employed in the method is about half the rennet used in a cheese making process that does not employ acidifying the pasteurized milk.

13. The method of claim 9, wherein coagulate formed by coagulating the pasteurized milk floats.

14. The method of claim 9, which further comprises cutting coagulate formed by coagulating the pasteurized milk to thereby form a whey-curd suspension.

15. The method of claim 14, which further comprises removing some whey from the whey-curd suspension after heating the whey-curd suspension to about 88° F. to 95° F.

16. The method of claim 15, wherein a portion of the whey that is removed is heated and added to the whey-curd suspension to heat the suspension or maintain the temperature of the suspension.

17. The method of claim 15, wherein a portion of the whey that is removed is cooled and added to the heated whey-curd suspension when the whey-curd suspension reaches a pH of about 5.3 to about 5.9.

18. The method of claim 14, which further comprises transferring the whey-curd suspension to an intermediate tank to facilitate draining, pH control or salting of curd.

19. The method of claim 14, which further comprises separating curds from whey.

20. The method of claim 19, wherein the method further comprises cooling the curd.

21. The method of claim 19, wherein the method further comprises adding salt to the curd.

22. The method of claim 21, wherein less salt is added than would have been added to curd made from milk that has not been acidified.

23. The method of claim 21, wherein the salted curd is cooled and cut into curd particles.

24. The method of claim 23, wherein the curd particles are frozen without aging.

25. The method of claim 21, wherein the curd is formed into a block.

26. The method of claim 25, wherein the block is cooled.

27. The method of claim 26, wherein the block is shredded or cut to produce particulate cheese.

28. The method of claim 27, wherein the particulate cheese is frozen.

29. The method of claim 1, wherein the cheese formed by the method is not subjected to a cooking and stretching step.

30. The method of claim 1, wherein the cheese formed by the method is not aged.

31. The method of claim 1, wherein no starch or water binding agent is added to cheese formed by the method.

32. The method of claim 1, wherein the cheese produced is a fat-free, low fat, reduced fat cheese or full fat cheese.

33. A method of making mozzarella cheese comprising carbonating pasteurized milk to about 1000 ppm $CO_2$ to about 2400 ppm $CO_2$ to produce a milk pH of about 5.80 to about 6.2 at a temperature of about 32° F. to about 95° F. prior to adding cheese making cultures and initiating a cheese making procedure.

34. The method of claim 33, wherein the milk is skim milk or reduced fat milk.

35. The method of claim 33, wherein the milk is a standardized milk product having a selected fat or protein content.

36. The method of claim 33, wherein cream, milk protein or milk fat is added to the skim milk after carbonation.

37. The method of claim 33, wherein no cooking or stretching of the mozzarella cheese is needed.

\* \* \* \* \*